(12) United States Patent
Small et al.

(10) Patent No.: US 11,107,168 B2
(45) Date of Patent: Aug. 31, 2021

(54) SECURE AND TRACEABLE MANUFACTURED PARTS

(71) Applicant: Moog Inc., East Aurora, NY (US)

(72) Inventors: George L. Small, Williamsville, NY (US); James F. van Oss, Buffalo, NY (US); James A. Regenor, Orchard Park, NY (US); Paul K. Guerrier, Orchard Park, NY (US)

(73) Assignee: Moog Inc., East Aurora, NY (US)

( * ) Notice: Subject to any disclaimer, the term of this patent is extended or adjusted under 35 U.S.C. 154(b) by 130 days.

(21) Appl. No.: 15/600,576

(22) Filed: May 19, 2017

(65) Prior Publication Data

US 2018/0012311 A1 Jan. 11, 2018

Related U.S. Application Data

(60) Provisional application No. 62/339,636, filed on May 20, 2016, provisional application No. 62/366,994, filed on Jul. 26, 2016, provisional application No. 62/470,428, filed on Mar. 13, 2017.

(51) Int. Cl.
*G06Q 20/40* (2012.01)
*G06Q 30/02* (2012.01)
(Continued)

(52) U.S. Cl.
CPC .............. *G06Q 50/04* (2013.01); *B33Y 50/02* (2014.12); *G06Q 10/08* (2013.01);
(Continued)

(58) Field of Classification Search
CPC .. G06Q 50/40; G06Q 50/00–34; G06Q 10/08; G06Q 10/00–30; G06Q 20/3825;
(Continued)

(56) References Cited

U.S. PATENT DOCUMENTS

| 5,768,384 A | 6/1998 | Berson |
| 7,343,209 B2 * | 3/2008 | Anelle ............... G06F 30/15 |
| | | 700/87 |

(Continued)

FOREIGN PATENT DOCUMENTS

CN 104484584 A 4/2015

OTHER PUBLICATIONS

Herzberg: "Now, in the hyper-connected and ever evolving world, transparency is the new power." https://www.provenance.org/whitepaper © 2016 Project Provenance Ltd (17 pages).

(Continued)

*Primary Examiner* — John W Hayes
*Assistant Examiner* — Chenyuh Kuo
(74) *Attorney, Agent, or Firm* — Harter Secrest & Emery LLP

(57) ABSTRACT

A method for the verification and authentication of additive manufactured product, comprising the steps of receiving, from a customer, at least one customer requirement for a product, deriving at least one manufacturing requirement and generating a product geometry file for the product, recording, by a first computing device, to a distributed transaction register, a first transaction reflecting certification of the product geometry file, obtaining a first output reflecting the first transaction, printing the product with a 3D printer, recording, by a second computing device, to the distributed transaction register, a second transaction reflecting the printing of the product and the first output, obtaining a second output reflecting the second transaction, embedding within the product a unique code reflecting the second output, whereby the product geometry file and the printing of said product may be verified with the unique code such that the product may be authenticated.

13 Claims, 30 Drawing Sheets

(51) Int. Cl.

| | |
|---|---|
| *G06Q 20/32* | (2012.01) |
| *G06Q 20/34* | (2012.01) |
| *G06Q 20/38* | (2012.01) |
| *G06Q 50/04* | (2012.01) |
| *G06Q 10/08* | (2012.01) |
| *B33Y 50/02* | (2015.01) |
| *G06Q 30/00* | (2012.01) |
| *G06Q 30/06* | (2012.01) |

(52) U.S. Cl.
CPC ....... *G06Q 10/0833* (2013.01); *G06Q 20/389* (2013.01); *G06Q 20/3825* (2013.01); *G06Q 20/3829* (2013.01); *G06Q 30/0185* (2013.01); *G06Q 30/0609* (2013.01); *Y02P 90/30* (2015.11)

(58) Field of Classification Search
CPC ........... G06Q 20/3829; G06Q 30/0185; G06Q 30/0609; G06Q 30/00–08; G06Q 20/00–425; B33Y 50/02; B33Y 50/00–02; Y02P 90/30; Y02P 90/00–95
See application file for complete search history.

(56) References Cited

U.S. PATENT DOCUMENTS

| | | |
|---|---|---|
| 7,418,236 B2 | 8/2008 | Levin et al. |
| 9,306,750 B2 | 4/2016 | Syngkon et al. |
| 2005/0234823 A1 | 10/2005 | Schimpf |
| 2013/0026241 A1* | 1/2013 | Sakahashi ........ G06K 19/06037 235/494 |
| 2014/0279177 A1 | 9/2014 | Stump |
| 2015/0154575 A1 | 6/2015 | Krieger |
| 2015/0170242 A1 | 6/2015 | Bjorndahl |
| 2015/0253761 A1 | 9/2015 | Nelson et al. |
| 2015/0309502 A1* | 10/2015 | Breitgand .......... G06Q 30/0185 700/98 |
| 2015/0379510 A1 | 12/2015 | Smith |
| 2016/0098723 A1* | 4/2016 | Feeney ................ G06Q 20/065 705/75 |
| 2016/0098730 A1 | 4/2016 | Feeney |
| 2016/0164884 A1* | 6/2016 | Sriram ................ G06Q 10/087 705/51 |
| 2016/0171354 A1 | 6/2016 | Glasgow et al. |
| 2016/0180061 A1 | 6/2016 | Pogorelik et al. |
| 2017/0255171 A1* | 9/2017 | Avula ..................... B33Y 50/02 |
| 2017/0279783 A1* | 9/2017 | Milazzo ................. B29C 64/00 |

OTHER PUBLICATIONS

Kim S. Nash: "IBM Pushes Blockchain into the Supply Chain" The Wall Street Journal article, Jul. 14, 2016, (3 Pages).
International Search Report and Written Opinion of the International Searching Authority dated Jul. 19, 2017 (17 pages).

\* cited by examiner

CUSTOMER REQUIREMENTS PROCESS STATE - I/O DATABASE

| PROCESS STATE | INPUT/OUTPUT | DESCRIPTION |
|---|---|---|
| 1 | DESCRIPTION | CUSTOMER ORDER 50 |
| 1 | INPUT | NONE |
| 1 | OUTPUT | CUSTOMER REQUIREMENTS DOCUMENT 102 |
| 1 | OUTPUT | CUSTOMER IP ARTIFACT(S) 105 |
| 1 | OUTPUT | DESIGN AUTHORITY ARTIFACT(S) 106 |
| 1 | OUTPUT | OTHER IP ARTIFACT(S) 107 |

FIG. 8

DESIGN IMPLEMENTATION REQUIREMENTS PROCESS STATE - I/O DATABASE

| PROCESS STATE | INPUT/OUTPUT | DESCRIPTION |
|---|---|---|
| 2 | DESCRIPTION | DESIGN IMPLEMENTATION REQUIREMENTS 51 |
| 2 | INPUT | CUSTOMER REQUIREMENTS DOCUMENT 102 |
| 2 | INPUT | CUSTOMER IP ARTIFACT(S) 105 |
| 2 | INPUT | DESIGN AUTHORITY ARTIFACT(S) 106 |
| 2 | INPUT | OTHER IP ARTIFACT(S) 107 |
| 2 | OUTPUT | SOLID MODEL(PRT FILE) - GEOMETRY DEFINITION 108 |
| 2 | OUTPUT | PRODUCT MANUFACTURING INFORMATION 109 |
| 2 | OUTPUT | MATERIAL REQUIREMENT (COMPOSITION) 110 |
| 2 | OUTPUT | QUALITY REQUIREMENT 111 |
| 2 | OUTPUT | MANUFACTURING PROCESS REQUIREMENTS (WHAT MACHINE MODEL) 112 |
| 2 | OUTPUT | PART SERIAL NUMBER 113 |
| 2 | OUTPUT | MATERIAL REQUIREMENT (COMPOSITION) 115 |
| 2 | OUTPUT | PART NUMBER 114 |

FIG. 9

MANUFACTURING PRE-PROCESSING PROCESS STATE - I/O DATABASE

| PROCESS STATE | INPUT/OUTPUT | DESCRIPTION |
|---|---|---|
| 3 | DESCRIPTION | MANUFACTURING PRE-PROCESSING (AKA CAD GEOMETRY FILE) 52 |
| 3 | INPUT | SOLID MODEL (PRT FILE) - GEOMETRY DEFINITION 108 |
| 3 | INPUT | PRODUCT MANUFACTURING INFORMATION 109 |
| 3 | OUTPUT | STL FILE, AMF FILE, EQUIVALENT OTHER 125 |

FIG. 13

POWDER PROCUREMENT AND STOCKING PROCESS STATE - I/O DATABASE

| PROCESS STATE | INPUT/OUTPUT | DESCRIPTION |
|---|---|---|
| 4 | DESCRIPTION | POWDER PROCUREMENT AND STOCKING PROCESS 53 |
| 4 | INPUT | MATERIAL REQUIREMENT (COMPOSITION) 115 |
| 4 | OUTPUT | NEW POWDER 122 |

FIG. 14

MACHINE CALIBRATION PARAMETER GENERATION PROCESS STATE - I/O DATABASE

| PROCESS STATE | INPUT/OUTPUT | DESCRIPTION |
|---|---|---|
| 5 | DESCRIPTION | MACHINE CALIBRATION PARAMETER GENERATION 54 |
| 5 | INPUT | MATERIAL REQUIREMENT (COMPOSITION) 115 |
| 5 | INPUT | MANUFACTURING PROCESS REQUIREMENTS 112 |
| 5 | OUTPUT | (WHAT MACHINE MODEL) MACHINE CALIBRATION SETTINGS 119 |
| 5 | OUTPUT | MANUFACTURER CAGE CODE 120 |
|   | OUTPUT | MACHINE SERIAL NUMBER USED FOR MANUFACTURE 121 |

FIG. 15

POWDER INSPECTION PROCESS STATE - I/O DATABASE

| PROCESS STATE | INPUT/OUTPUT | DESCRIPTION |
|---|---|---|
| 6 | DESCRIPTION | POWDER INSPECTION PROCESS   55 |
| 6 | INPUT | NEW POWDER   122 |
| 6 | INPUT | USED POWDER   123 |
| 6 | OUTPUT | INSPECTED POWDER   126 |

FIG. 18

MACHINE PRE-PROCESSING TRANSFORMATION PROCESS STATE - I/O DATABASE

| PROCESS STATE | INPUT/OUTPUT | DESCRIPTION |
|---|---|---|
| 9 | DESCRIPTION | MACHINE PRE-PROCESSOR TRANSFORMATION   56 |
| 9 | INPUT | STL FILE, AMF FILE, EQUIVALENT OTHER   125 |
| 9 | INPUT | PRODUCT MANUFACTURING INFORMATION   109 |
| 9 | INPUT | MATERIAL REQUIREMENT (COMPOSITION)   115 |
| 9 | INPUT | MANUFACTURING PROCESS REQUIREMENTS (WHAT MACHINE MODEL)   112 |
| 9 | INPUT | 2D OR 3D BAR CODE OR PART GLYPH   129 |
| 9 | OUTPUT | MACHINE TOOL PATH FILE   130 |

FIG. 19

ADDITIVE MANUFACTURING PROCESS STATE - I/O DATABASE

| PROCESS STATE | INPUT/OUTPUT | DESCRIPTION |
|---|---|---|
| 10 | DESCRIPTION | LPBM PRINT 57 |
| 10 | INPUT | MACHINE TOOL PATH FILE 130 |
| 10 | INPUT | INSPECTED POWDER 126 |
| 10 | INPUT | MACHINE CALIBRATION SETTINGS 119 |
| 10 | INPUT | PART SERIAL NUMBER 113 |
| 10 | INPUT | PART NUMBER 114 |
| 10 | INPUT | MANUFACTURER CAGE CODE 120 |
| 10 | INPUT | MANUFACTURING PROCESS REQUIREMENTS (WHAT MACHINE MODEL) 112 |
| 10 | INPUT | MACHINE SERIAL NUMBER USED FOR MANUFACTURE 121 |
| 10 | INPUT | 2D OR 3D BAR CODE OR PART GLYPH 129 |
| 10 | OUTPUT | PIECE PART 132 |
| 10 | OUTPUT | USED POWDER 123 |
| 10 | OUTPUT | VERIFICATION COUPONS 134 |

FIG. 22

PART POST PROCESSING PROCESS STATE - I/O DATABASE

| PROCESS STATE | INPUT/OUTPUT | DESCRIPTION |
|---|---|---|
| 11 | DESCRIPTION | PART POST PROCESSING 58 |
| 11 | INPUT | PIECE PART 132 |
| 11 | INPUT | PRODUCT MANUFACTURING INFORMATION 109 |
| 11 | OUTPUT | POST PROCESSED (FINISHED) PART 133 |

FIG. 23

PART INSPECTION PROCESS STATE - I/O DATABASE

| PROCESS STATE | INPUT/OUTPUT | DESCRIPTION |
|---|---|---|
| 12 | DESCRIPTION | PART POST INSPECTION  59 |
| 12 | INPUT | POST PROCESSED (FINISHED) PART  133 |
| 12 | INPUT | SOLID MODEL (PRT FILE) - GEOMETRY DEFINITION  108 |
| 12 | INPUT | PRODUCT MANUFACTURING INFORMATION  109 |
| 12 | INPUT | QUALITY REQUIREMENT  111 |
| 12 | INPUT | VERIFICATION COUPONS  134 |
| 12 | OUTPUT | POST PROCESSED, FINISHED AND INSPECTED PART  135 |
| 12 | OUTPUT | INSPECTION RECORD  136 |
| 12 | OUTPUT | CERTIFICATION OF COMPLIANCE  138 |

FIG. 26

PART END USER DELIVERY PROCESS STATE - I/O DATABASE

| PROCESS STATE | INPUT/OUTPUT | DESCRIPTION |
|---|---|---|
| 13 | DESCRIPTION | PART END USER DELIVERY  60 |
| 13 | INPUT | POST PROCESSED, FINISHED AND INSPECTED PART  135 |
| 13 | INPUT | INSPECTION RECORD  136 |
| 13 | INPUT | CERTIFICATION OF COMPLIANCE  138 |
| 13 | OUTPUT | POST PROCESSED, FINISHED AND INSPECTED PART  135 |
| 13 | OUTPUT | INSPECTION RECORD  136a |
| 13 | OUTPUT | CERTIFICATION OF COMPLIANCE  138a |
| 13 | INPUT | CERTIFICATION OF AUTHENTICITY  139 |
| 13 | OUTPUT | 2D OR 3D BAR CODE OR PART GLYPH  129 |
| 13 | OUTPUT | INVOICE  140 |

FIG. 27

SECURE AND TRACEABLE MANUFACTURED PARTS

TECHNICAL FIELD

This disclosure relates manufacturing, and more particularly to system that traces a manufactured part through its product lifecycle and records a series of authenticating transactions in a digital distributed ledger.

DESCRIPTION OF RELATED ART

U.S. Patent Application Publication No. 2016/0098723 entitled "System and Method for Block-Chain Verification of Goods" is directed to a method that includes scanning, by a computing device, using a code scanner, an address from a code affixed to a product, verifying, by the computing device, that the address is associated with a crypto-currency transaction recorded at a transaction register, obtaining, by the computing device, at least one current transaction datum, and determining, based on the verification and the at least one current transaction datum, that the product is authentic.

U.S. Patent Application Publication No. 2016/0098730 entitled "System and Method for Block-Chain Verification of Goods" is also directed to a method that includes obtaining, by a first computing device, a first address, exporting, by the first computing device, the first address to a first code affixed to a first product, filing, by the first computing device, a first crypto-currency transaction to the first address, at a transaction register, receiving, by a second computing device, from a code scanner, the first address, scanned from the first code affixed to the first product, verifying, by the second computing device, the first crypto-currency transaction at the transaction register, using the first address, and identifying, by the second computing device, based on the verification, that the first product is authentic.

BRIEF SUMMARY

With parenthetical reference to the corresponding parts, portions or surfaces of the disclosed embodiment, merely for purposes of illustration and not by way of limitation, an exemplary embodiment of the present disclosure provides a method for the verification and authentication of additive manufactured product comprising the steps of: receiving, from a customer (19), at least one customer requirement for a product (101); developing (210), from the at least one customer requirement, at least one manufacturing requirement (37) for the product; generating (218, 228, 236, 254), from the manufacturing requirement, a product geometry file (125) and at least one printer parameter (119, 120, 121, 122, 128, 130); recording (225, 234, 243, 260), by a first computing device (27*a*), to a distributed transaction register (17), a first transaction (90*c*) reflecting the product geometry file; printing (262), with a 3D additive printer (31) meeting the printer parameter, a product (132) using the product geometry file; obtaining a first output (84*c*) from the distributed transaction register that is associated with the first transaction; generating (306) a unique code (129) reflecting the first output; embedding (274) within the product the unique code; recording (271, 281), by a second computing device (27*b*), to the distributed transaction register, a second transaction (90*i*) reflecting the printing of the product and the first output; obtaining a second output (84*i*) from the distributed transaction register that is associated with the second transaction; whereby the product geometry file and the printing of the product may be verified with the unique code and the second output such that the product may be authenticated.

The at least one customer requirement for the product may be selected from a group consisting of quality parameters, material composition requirements, product definitions, manufacturing requirements and an IP artifact (105). The at least one manufacturing requirement for the product may be selected from a group consisting of product size, product weight, product strength, product geometry (109), a computer aided design (CAD) file (108), material requirements (110), and an IP artifact (106). The product geometry file may comprise an additive manufacturing file or a stereolithography file (125). The distributed transaction register may comprise a blockchain, and the step of recording the first transaction may comprise the step of recording the first transaction to a first block of the blockchain. The first transaction may comprise a transaction datum and the first output. The first output may comprise a blockchain address and the transaction datum may comprise a cryptographic hash digest reflecting the product geometry file. The step of recording the second transaction may comprise the step of recording the second transaction to a second block of the blockchain. The second transaction may comprise a transaction datum and the second output. The second output may comprise a blockchain address and the transaction datum may comprise a cryptographic hash digest reflecting the printing of the product. The step of embedding to the product the unique code reflecting the first output may comprise the step of printing the product with the unique code or etching the product with the unique code.

The method may comprise the steps of: generating, from the manufacturing requirement, as the at least one printer parameter, at least one 3D additive printer material parameter (122) and at least one 3D additive printer calibration parameter (119); recording (234, 243) to the distributed transaction register the first transaction such that the first transaction reflects the at least one 3D additive printer material parameter and the at least one 3D additive printer calibration parameter; printing, with the 3D additive printer meeting the 3D additive printer calibration parameter, the product using the product geometry file and the at least one 3D additive printer material parameter; whereby the at least one 3D additive printer material parameter and the at least one 3D additive printer calibration parameter may be verified with the unique code such that the product may be authenticated. The at least one 3D additive printer calibration parameter may be selected from a group consisting of speed, power, scan rate, and feed rate. The at least one 3D additive printer material parameter may be selected from a group consisting of aluminum, titanium, stainless steel, cobalt chrome, inconel, maraging steel, hastalloy-X, and copper. The distributed transaction register may comprise a blockchain, and the step of recording the first transaction may comprise the step of recording the first transaction to a first block of the blockchain. The step of recording the first transaction may comprise the step of recording to the first block an entry reflecting the product geometry file, the 3D additive printer calibration parameter, and the 3D additive printer material parameter.

The method may comprise the steps of: recording (208), by a third computing device, to the distributed transaction register, a third transaction (90*a*) reflecting the at least one customer requirement for the product; obtaining a third output from the distributed transaction register that is associated with the third transaction; recording (216), by a fourth computing device, to the distributed transaction register, a fourth transaction (90b) reflecting the at least one manufacturing requirement for the product; obtaining a fourth output from the distributed transaction register that is associated with the fourth transaction; wherein the fourth output reflects the third output and the first output reflects the fourth output; whereby the at least one customer requirement for the product and the at least one manufacturing requirement for the product may be verified with the unique code such that the product may be authenticated. The at least one customer requirement for the product may be selected from a group consisting of quality parameters, material composition requirements, product definitions, manufacturing requirements and an IP artifact. The at least one manufacturing requirement for the product may be selected from a group consisting of product size, product weight, product strength, product geometry, a computer aided design file, material requirements, and an IP artifact. The distributed transaction register may comprise a blockchain, and the step of recording the third transaction may comprise the step of recording the third transaction to a third block of the blockchain and the step of recording the fourth transaction may comprise the step of recording the fourth transaction to a fourth block of the blockchain. The method may comprise the steps of: recording (281), by a fifth computing device, to the distributed transaction register, a fifth transaction (90j) reflecting the embedding or affixing to the product the unique code reflecting the second output; obtaining a fifth output from the distributed transaction register that is associated with the fifth transaction and the second output; inspecting (283) the product; recording (292), by a sixth computing device, to the distributed transaction register, a sixth transaction (90k) reflecting the inspection of the product; whereby the embedding or affixing to the product the unique code and the inspection of the product may be verified with the distributed transaction register. The distributed transaction register may comprise a blockchain, and the step of recording the fifth transaction may comprise the step of recording the fifth transaction to a fifth block of the blockchain and the step of recording the sixth transaction may comprise the step of recording the sixth transaction to a sixth block of the blockchain. The method may comprise the steps of: obtaining a sixth output from the distributed transaction register that is associated with the sixth transaction and the fifth output; delivering the product to an end user; recording (304), by a seventh computing device, to the distributed transaction register, a seventh transaction (90L) reflecting the delivery of the product to the end user; whereby the delivery of the product to the end user may be verified with the distributed transaction register. The method may comprise the steps of obtaining a seventh output from the distributed transaction register that is associated with the seventh transaction and the sixth output; installing the product for end use; recording, by a eighth computing device, to the distributed transaction register, an eighth transaction reflecting the installation of the product for end use; whereby the installation of the product for end use may be verified with the distributed transaction register. The distributed transaction register may comprise a blockchain, and the step of recording the seventh transaction may comprise the step of recording the seventh transaction to a seventh block of the blockchain and the step of recording the eighth transaction may comprise the step of recording the eighth transaction to an eighth block of the blockchain.

The method may comprise the step of generating a transaction record reflecting the first transaction and the second transaction from the distributed transaction register. The method may comprise the steps of: scanning (310), by a computing device, the unique code embedded in or affixed to the product; verifying (41), by the computing device, that the code is associated with the second output of the distributed transaction register; obtaining, by the computing device, at least one current transaction datum (85); and determining (306), based on the verification and the at least one current transaction datum, that the product is authentic.

Another exemplary embodiment of the present disclosure provides a database system comprising: at least one customer requirement for a product; at least one manufacturing requirement for the product developed from the at least one customer requirement; a product geometry file generated from the manufacturing requirement; a distributed transaction register having a first transaction reflecting the product geometry file; the distributed transaction register having a second transaction reflecting a printing of the product with an additive printer meeting a printer parameter; whereby the product geometry file and the printing of the product may be verified with a unique code such that the product may be authenticated.

Another exemplary embodiment of the present disclosure provides a computer system comprising: a first computing device configured to communicate with a server network (16) having a plurality of node servers (14) storing a distributed transaction ledger (17); a second computing device configured to communicate with the server network having the plurality of node servers storing the distributed transaction ledger; a 3D additive printer (31) for printing a product; a mechanism for embedding or affixing a code to a product; whereby the first computing device is configured to record to the distributed transaction register a first transaction reflecting a product geometry file generated from at least one manufacturing requirement for a product; whereby the 3D additive printer is configured to print the product using the product geometry file; one of the first, second or a third computing device is configured to generate a unique product code that reflects the first transaction; whereby the mechanism is configured to embed or affix the unique product code reflecting the first transaction to the product; whereby the second computing device is configured to record to the distributed transaction register a second transaction reflecting the printing of the product; whereby the product geometry file may be verified with the unique code and an output from the second transaction such that the product may be authenticated. The 3D additive printer may comprise the mechanism for embedding or affixing the unique product code to the product.

Another exemplary embodiment of the present disclosure provides a method of verifying, the method comprising: (a) receiving a plurality of products from a plurality of entities (35, 36), wherein each one of the plurality of products has an associated distributed transaction register storing product information; (b) determining the product information from the distributed transaction register; and (c) aggregating the product information. The product information may comprise at least one of product requirements (101), product processes (62) or materials (61), product custody (63), product remuneration (64), and product intellectual property (106). The distributed transaction register may be one of a private digital ledger and a public digital ledger. The method may further comprise transferring the aggregated product information and an end product to a third party (29), wherein the end product may be a combination of the plurality of products. The method may further comprising, prior to receiving the plurality of products, receiving access to the distributed transaction register storing product information.

Another exemplary embodiment of the present disclosure provides an apparatus for verification, the apparatus comprising: at least one processor and at least one memory storing computer program instructions, wherein the at least one memory with the computer program instructions may be configured with the at least one processor to cause the apparatus to at least: in response to receiving a plurality of products from a plurality of entities, determine a product information from a distributed transaction register, wherein each one of the plurality of products has an associated distributed transaction register storing product information; and aggregate the product information. The product information may comprise at least one of product requirements, product processes or materials, product custody, product remuneration, and product intellectual property. The at least one memory with the computer program instructions may be configured with the at least one processor to further cause the apparatus to at least prior to receiving the plurality of products, receive access to the distributed transaction register storing product information. The distributed transaction register may be one of a private digital ledger and a public digital ledger.

Another exemplary embodiment of the present disclosure provides a non-transitory computer-readable medium tangibly comprising computer program instructions, which, when executed by a processor, causes the processor to at least: in response to receiving a plurality of products from a plurality of entities, determine a product information from a distributed transaction register, wherein each one of the plurality of products has an associated distributed transaction register storing product information; and aggregate the product information. The product information may comprise at least one of product requirements, product processes or materials, product custody, product remuneration, and product intellectual property. The processor may be further caused to prior to receiving the plurality of products, receive access to the distributed transaction register storing product information. The distributed transaction register may be one of a private digital ledger and a public digital ledger.

Another exemplary embodiment of the present disclosure provides a method for the provenance, verification and authentication of a manufactured product, comprising the steps of receiving, from a customer, at least one customer requirement for a product, developing at least one IP artifact, deriving at least one manufacturing requirement, and generating a product geometry file for the product, recording, by a first computing device, to a distributed transaction register, a first transaction reflecting certification of the product geometry file incorporating the IP artifact and the manufacturing requirement, obtaining a first output reflecting the first transaction, printing the product with a 3D printer, recording, by a second computing device, to the distributed transaction register, a second transaction reflecting the printing of the product and the first output, obtaining a second output reflecting the second transaction, embedding within the product a unique code reflecting the second output, whereby the product geometry file and the printing of the product may be verified with the unique code such that the product may be authenticated as genuine.

Another exemplary embodiment of the present disclosure provides a method of tracking, the method comprising: (a) associating an information with a part, the information comprising at least one of a patent, invention, trademark, copyright, work of authorship, or know-how embodied in the item; and (b) recording the associated information of the part within a database, wherein the recording further may comprise encrypting the associated information within the database and assigning a unique identifier to the part. The database may be a public or a private ledger. The database may be a PLM. The method may further comprise encrypting the recorded associated information of the part.

Another exemplary embodiment of the present disclosure provides a database system. The database system includes at least one customer requirement for a product, at least one IP artifact, at least one manufacturing requirement for the product developed from the at least one customer requirement, and a product geometry file generated from the manufacturing requirement and the one IP artifact. The database system further includes a distributed transaction register having a first transaction reflecting the product geometry file, the distributed transaction register having a second transaction reflecting a printing of the product with an additive printer meeting at least one printer parameter, and whereby the product geometry file and the printing of the product may be verified with a unique code such that the product may be authenticated as genuine.

Another exemplary embodiment of the present disclosure provides a method including associating an information with a part, the information comprising at least one of a patent, invention, trademark, copyright, work of authorship, or know-how embodied in the item, and recording the associated information of the part within a database, wherein the recording further comprises encrypting the associated information within the database and assigning a unique identifier to the part.

It is an object of the present disclosure to provide a method, apparatus, computer-readable medium, database system, and computing system for verification and provenance.

The following will describe embodiments of the present invention, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE DRAWINGS

FIG. 8 is a database disclosing the process inputs and outputs of an embodiment of the customer requirements process state shown in FIG. 6.

FIG. 9 is a database disclosing the process inputs and outputs of an embodiment of the design implementation requirements process state shown in FIG. 7.

FIG. 13 is a database disclosing the process inputs and outputs of an embodiment of the manufacturing pre-processing requirements process state shown in FIG. 10.

FIG. 14 is a database disclosing the process inputs and outputs of an embodiment of the powder procurement and stocking process state shown in FIG. 11.

FIG. 15 is a database disclosing the process inputs and outputs of an embodiment of the machine calibration parameter generation process state shown in FIG. 12.

FIG. 18 is a database disclosing the process inputs and outputs of an embodiment of the powder inspection process state shown in FIG. 16.

FIG. 19 is a database disclosing the process inputs and outputs of an embodiment of the machine pre-processing transformation process state shown in FIG. 17.

FIG. 22 is a database disclosing the process inputs and outputs of an additive manufacturing process state shown in FIG. 20.

FIG. 23 is a database disclosing the process inputs and outputs of an embodiment of the part post-processing process state shown in FIG. 21.

FIG. 26 is a database disclosing the process inputs and outputs of an embodiment of the part inspection process state shown in FIG. 24.

FIG. 27 is a database disclosing the process inputs and outputs of an embodiment of the part end user delivery requirements process state shown in FIG. 25.

DETAILED DESCRIPTION OF THE EMBODIMENTS

Figure 1:
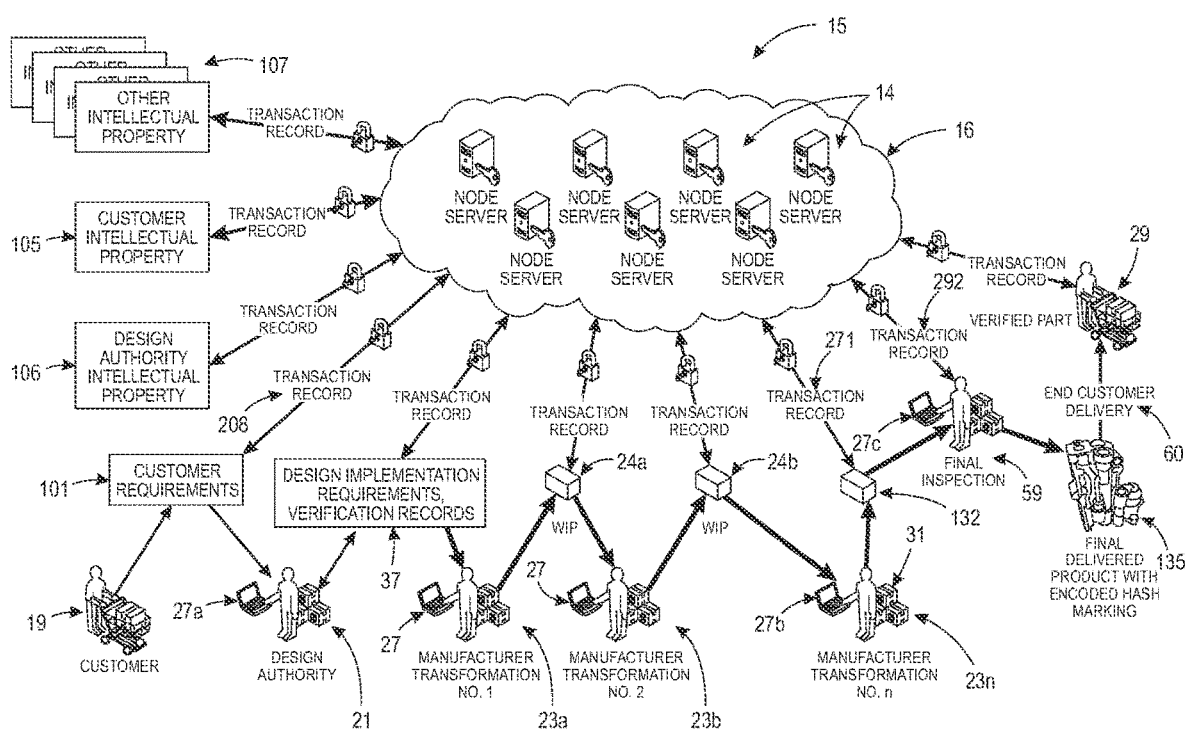
FIG. 1 is a schematic diagram showing an embodiment of the disclosed virtual distributed inventory management system and ledger with traceability and authentication at each transaction for a manufactured part.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention.

Exemplary embodiments of the present invention are described largely in the context of a fully functional computer system for executing a method of securely tracing manufactured parts. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, solid state media, or other suitable media. Examples of recordable media include magnetic disks in hard drives or diskettes, compact disks for optical drives, magnetic tape, solid state memory devices, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the disclosed method as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

The flowcharts and block diagrams in FIGS. 1-34 illustrate the architecture, functionality, and operation of possible implementations of systems and methods according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Digital systems generally include one or more processors that execute software, and various hardware devices that can be controlled by the software. For example, digital systems include computer systems such as desktops, laptops, net tops, servers, workstations, etc.; mobile devices such as cellular phones, personal digital assistants, smart phones, etc.; and other special purpose devices. The hardware devices may generally provide certain functionality such as storage (e.g. disk drives, flash memory, optical drives, etc.), communications (e.g. networking, wireless operation, etc.), and other input/output functionality (touch screen, keyboard, mouse, display, audio, etc.).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

Computing Devices.

Referring now to the distributed computer network illustrated in FIG. 1, the computing devices of the system embodiments discussed herein, including computing devices 27, 27a and 27b, comprise a main memory, such as random access memory (RAM), and may also include a secondary memory. Secondary memory may include, for example, a hard disk drive, a removable storage drive or interface, connected to a removable storage unit, or other similar means. As will be appreciated by persons skilled in the relevant art, a removable storage unit includes a computer usable storage medium having stored therein computer software and/or data. Examples of additional means creating secondary memory may include a program cartridge and cartridge interface (such as that found in video game devices), a removable memory chip (such as an EPROM, or PROM) and associated socket, and other removable storage units and interfaces which allow software and data to be transferred from the removable storage unit to the computer system. In some embodiments, to "maintain" data in the memory of a computing device means to store that data in that memory in a form convenient for retrieval as required by the algorithm at issue, and to retrieve, update, or delete the data as needed.

The subject computing device may also include a communications interface. The communications interface allows software and data to be transferred between the computing device and external devices. The communications interface may include a modem, a network interface (such as an Ethernet card), a communications port, a PCMCIA slot and card, or other means to couple the computing device to external devices. Software and data transferred via the communications interface may be in the form of signals, which may be electronic, electromagnetic, optical, or other signals capable of being received by the communications interface. These signals may be provided to the communications interface via wire or cable, fiber optics, a phone line, a cellular phone link, and radio frequency link or other communications channels. Other devices may be coupled to the computing device via the communications interface. In some embodiments, a device or component is "coupled" to a computing device if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device may be coupled to a second computing device (not shown); for instance, a server may be coupled to a client device, as described below in greater detail.

The communications interface in the system embodiments discussed herein facilitates the coupling of the computing device with data entry devices, the device's display, and network connections, whether wired or wireless. In some embodiments, "data entry devices" are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location and altitude on the surface of the Earth. Navigation facilities can include a receiver configured to communicate with the Global Positioning System or with similar satellite networks, as well as any other system that mobile phones or other devices use to ascertain their location, for example by communicating with cell towers. A code scanner coupled to a computing device is a device that can extract information from a "code" attached to an object. In one embodiment, a code contains data concerning the object to which it is attached that may be extracted automatically by a scanner; for instance, a code may be a bar code whose data may be extracted using a laser scanner. A code may include a quick-read (QR) code whose data may be extracted by a digital scanner or camera. A code may include a radiofrequency identification (RFID) tag; the code may include an active RFID tag. The code may include a passive RFID tag. A computing device may also be coupled to a code exporter; in an embodiment, a code exporter is a device that can put data into a code. For instance, where the code is a two-dimensional image printed on paper, or a three dimensional printed object, or another object, the code exporter may be a printer. Where the code is a non-writable RFID tag, the code exporter may be a device that can produce a non-writable RFID tag. Where the code is a writable RFID tag, the code exporter may be an RFID writer; the code exporter may also be a code scanner, in some embodiments.

In some embodiments, a computing device's "display" is a device coupled to the computing device, by means of which the computing device can display images. Display include without limitation monitors, screens, television devices, and projectors.

Computer programs (also called computer control logic) are stored in main memory and/or secondary memory. Computer programs may also be received via the communications interface. Such computer programs, when executed, enable the processor device to implement the system embodiments discussed below. Accordingly, such computer programs represent controllers of the system. Where embodiments are implemented using software, the software may be stored in a computer program product and loaded into the computing device using a removable storage drive or interface, a hard disk drive, or a communications interface.

The computing device may also store data in database accessible to the device. A database is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor, a communication infrastructure, at least a main memory, and usually a communications interface, not all devices will necessarily house these facilities separately. For instance, in some forms of computing devices as defined above, processing and memory could be distributed through the same hardware device, as in a neural net or grid, and thus the communications infrastructure could be a property of the configuration of that particular hardware device. Many devices do practice a physical division of tasks as set forth above, however, and practitioners skilled in the art will understand the conceptual separation of tasks as applicable even where physical components are merged.

The systems may be deployed in a number of ways, including on a stand-alone computing device, a set of computing devices working together in a network, such as server network 16, or a web application. Persons of ordinary skill in the art will recognize a web application as a particular kind of computer program system designed to function across a network, such as the Internet. Web application platforms typically include at least one client device, which is a computing device as described above. The client device connects via some form of network connection to a network, such as the Internet. The network may be any arrangement that links together computing devices, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network is at least one server, such as node servers 14, which is also a computing device as described above, or a set of computing devices that communicate with each other and work in concert by local or network connections. Of course, practitioners of ordinary skill in the relevant art will recognize that a web application can, and typically does, run on several servers and a vast and continuously changing population of client devices. Computer programs on both the client device and the server configure both devices to perform the functions required of the web application. Web applications can be designed so that the bulk of their processing tasks are accomplished by the server, as configured to perform those tasks by its web application program, or alternatively by the client device. Some web applications are designed so that the client device solely displays content that is sent to it by the server, and the server performs all of the processing, business logic, and data storage tasks. Such "thin client" web applications are sometimes referred to as "cloud" applications, because essentially all computing tasks are performed by a set of servers and data centers visible to the client only as a single opaque entity, often represented on diagrams as a cloud.

Many computing devices, as defined herein, come equipped with a specialized program, known as a web browser, which enables them to act as a client device at least for the purposes of receiving and displaying data output by the server without any additional programming. Web browsers can also act as a platform to run so much of a web application as is being performed by the client device, and it is a common practice to write the portion of a web application calculated to run on the client device to be operated entirely by a web browser. Such browser-executed programs are referred to herein as "client-side programs," and frequently are loaded onto the browser from the server at the same time as the other content the server sends to the browser. However, it is also possible to write programs that do not run on web browsers but still cause a computing device to operate as a web application client. Thus, as a general matter, web applications require some computer program configuration of both the client device (or devices) and the server. The computer program that comprises the web application component on either computing device's system configures that device's processor to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Encryption Methods.

Figure 3:
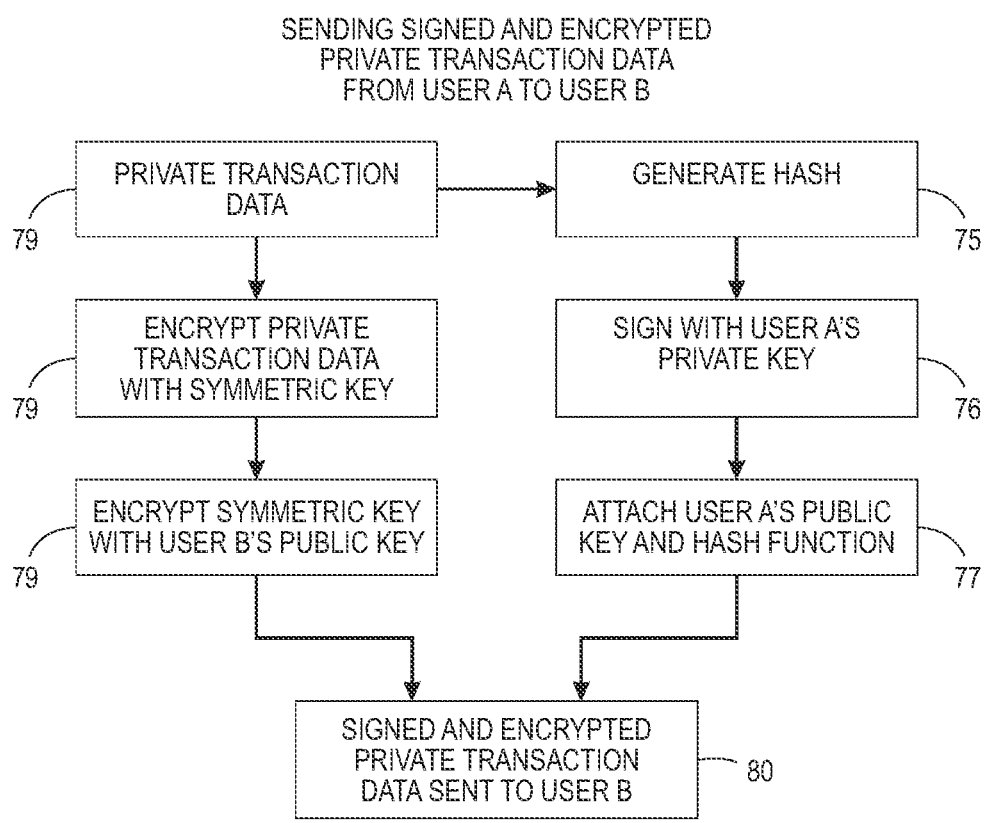
FIG. 3 is a flowchart disclosing the method steps of an embodiment for sending encrypted transaction data from a first user to a second user.
Figure 4:
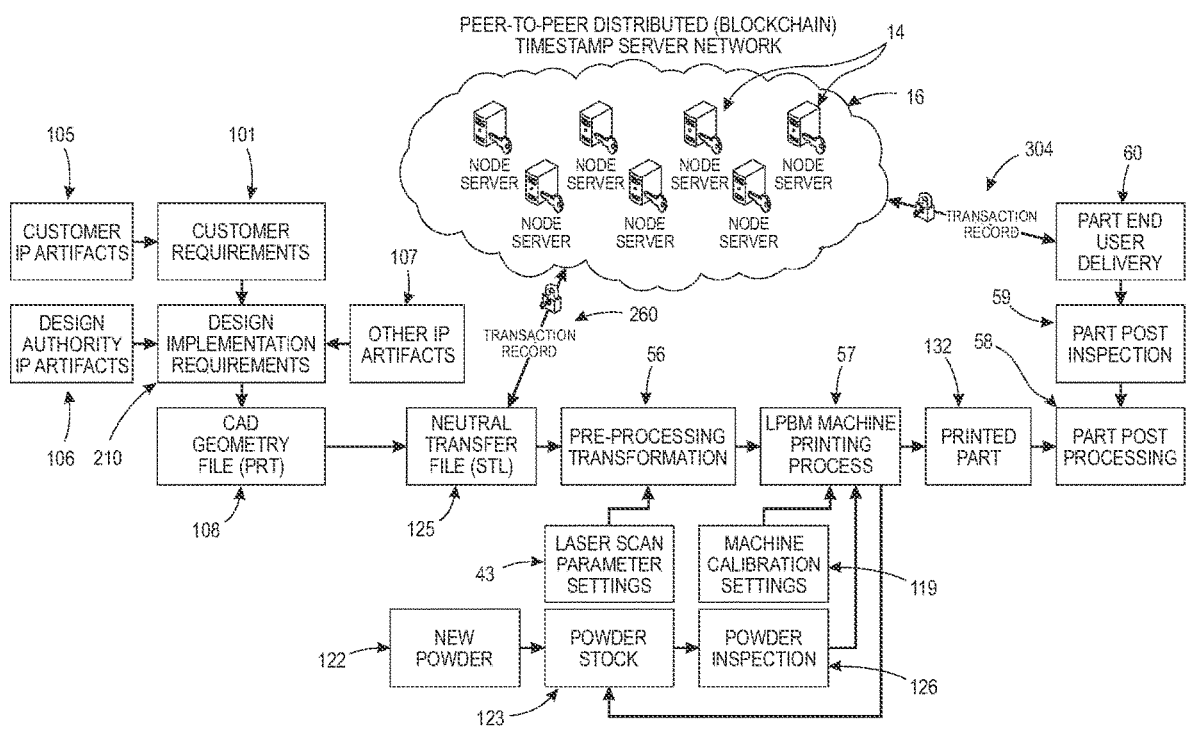
FIG. 4 is a flowchart disclosing the major process states of the disclosed virtual distributed ledger system.
Figure 5A:
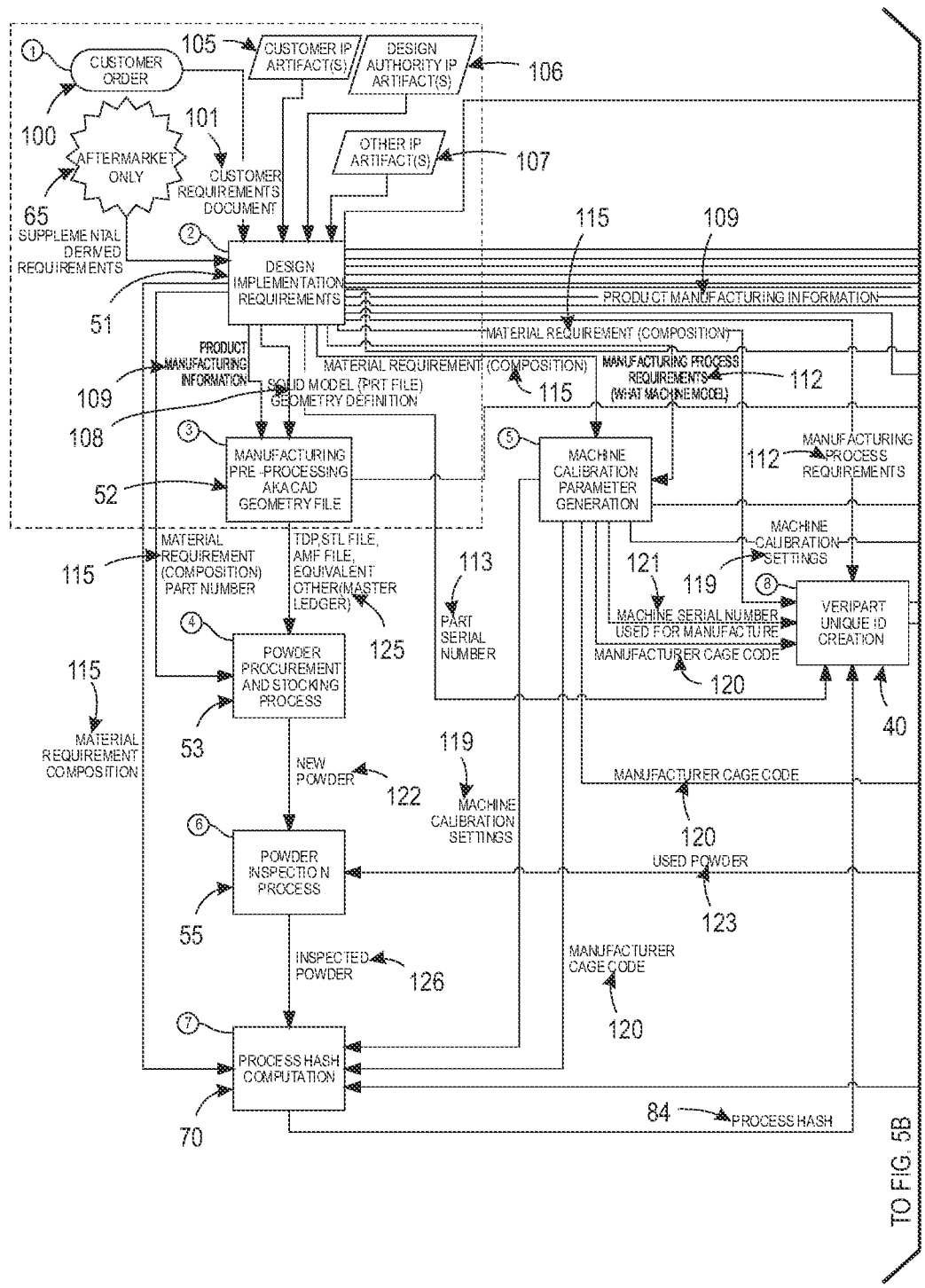
FIGS. 5A and 5B are a schematic diagram disclosing the major process states, and inputs and outputs for each state, of an embodiment of the disclosed virtual distributed ledger system.
Figure 5B:
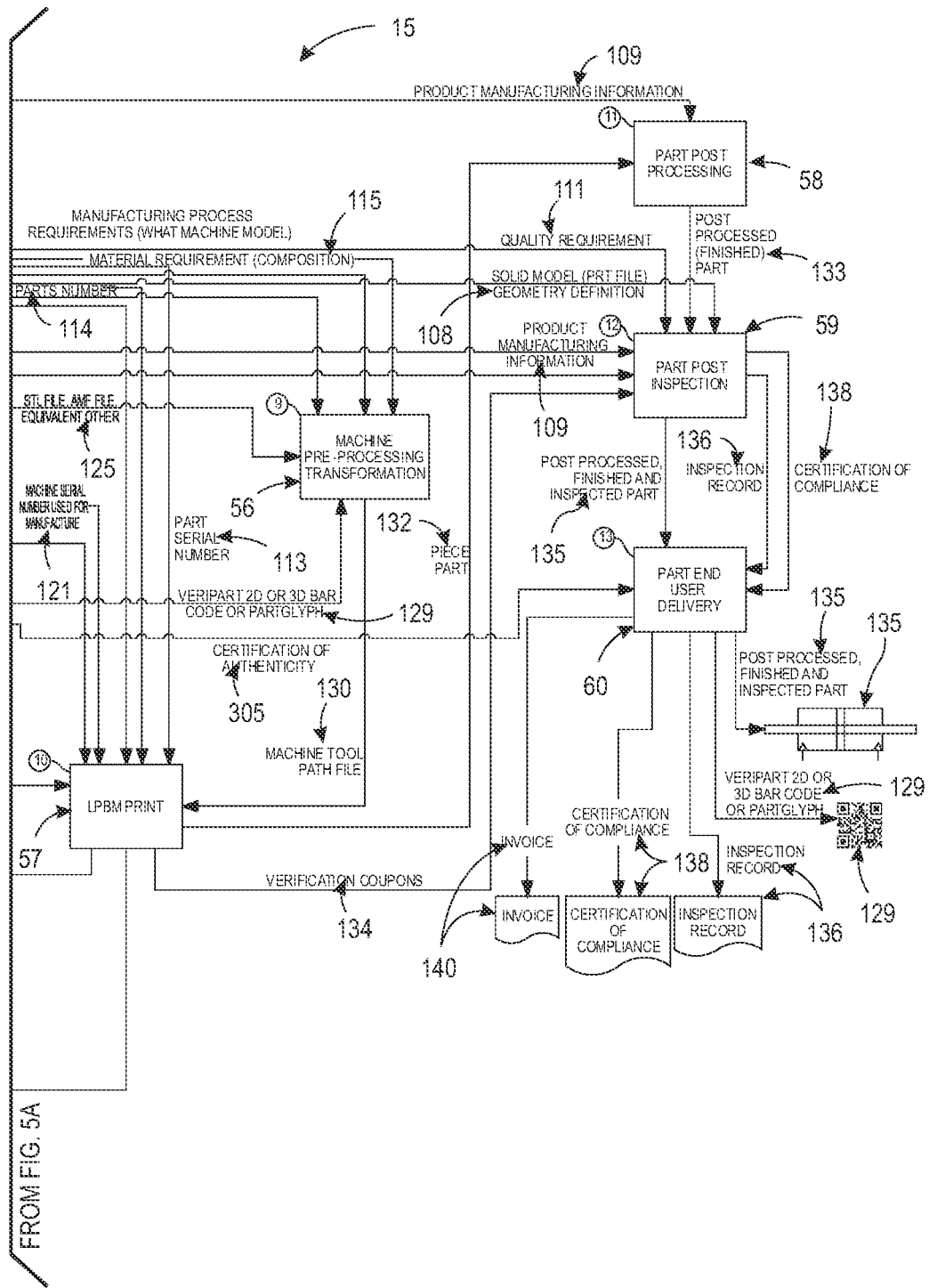

Referring now to the method steps illustrated in FIG. 3, the subject computing device may employ one or more security measures to protect the computing device or its data. For instance, the computing device may protect data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext is unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

The one or more client devices and the one or more servers may communicate using any protocol according to which data may be transmitted from the client to the server and vice versa. As a non-limiting example, the client and server may exchange data using the Internet protocol suite, which includes the transfer control protocol (TCP) and the Internet Protocol (IP), and is sometimes referred to as TCP/IP. In some embodiments, the client and server encrypt data prior to exchanging the data, using a cryptographic system as described above. In one embodiment, the client and server exchange the data using public key cryptography; for instance, the client and the server may each generate a public and private key, exchange public keys, and encrypt the data using each other's' public keys while decrypting it using each other's' private keys.

In some embodiments, the client authenticates the server or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum. The authorization may be the authorization to access a given process. In some embodiments, the certificate may identify the certificate authority.

The linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publically available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity, and links the file to the entity in a verifiable way. The digital signature may be incorporated in a digital certificate, which is a document authenticating the entity possessing the private key by authority of the issuing certificate authority, and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

The server and client may communicate using a security combining public key encryption, private key encryption, and digital certificates. For instance, the client may authenticate the server using a digital certificate provided by the server. The server may authenticate the client using a digital certificate provided by the client. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between the client and the server; for instance, the secret may be a private key for a private key cryptographic system. The secret may be a datum from which the private key may be derived. The client and server may then use that private key cryptographic system to exchange information until the exchange in which they are communicating ends. In some embodiments, this handshake and secure communication protocol is implemented using the secure sockets layer (SSL) protocol. In other embodiments, the protocol is implemented using the transport layer security (TLS) protocol. The server and client may communicate using hyper-text transfer protocol secure (HTTPS).

In the embodiment illustrated in FIG. 3, signed and encrypted private transaction data 36 is sent from a first user A to a second user B by generating a hash 75, signing with the first user's private key 76 and attaching the first user's public key and hash function 77. The private transaction data is encrypted with a symmetric key 78 and the symmetric key is encrypted with the second user's public key 79. The signed and encrypted private transaction data is then sent to the second user B 80.

Blockchain.

In one embodiment, the blockchain is a transaction register or ledger that records one or more new transactions in a data item known as a block. The blocks may be created in a way that places the blocks in chronological order, and links each block (b) to a previous block (a) in the chronological order, so that any computing device may traverse the blocks in reverse chronological order to verify any transactions listed in the blockchain. As an example, each new block (b) may be required to contain a cryptographic hash describing the previous block (a). In some embodiments, the blockchain contains a single first block, known as a "genesis block."

The creation of a new block (b) may be computationally expensive; for instance, the creation of a new block (b) may be designed by a protocol accepted by all participants in forming the blockchain to take a powerful set of computing devices a certain period of time to produce. Where one block (a) takes less time for a given set of computing devices to produce the block (a), the protocol may adjust the algorithm to produce the next block (b) so that it will require more steps; where one block (a) takes more time for a given set of computing devices to produce the block (a), protocol may adjust the algorithm to produce the next block (b) so that it will require fewer steps. As an example, the protocol may require a new block (b) to contain a cryptographic hash describing its contents; the cryptographic hash may be required to satisfy a mathematical condition, achieved by having the block (b) contain a number, called a nonce, whose value is determined after the fact by the discovery of the hash that satisfies the mathematical condition. Continuing the example, the protocol may be able to adjust the mathematical condition so that the discovery of the hash describing a block and satisfying the mathematical condition requires more or less steps, depending on the outcome of the previous hashing attempt. The mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, the production of a new block (b) according to the protocol is known as "mining."

In some embodiments, the protocol also creates an incentive to mine new blocks. The incentive may be financial; for instance, successfully mining a new block (b) may result in the person or entity that mines the block (b) receiving a predetermined amount of currency, such as fiat currency or crypto-currency. In other embodiments, the incentive may be redeemed for particular products or services; the incentive may be a gift certificate with a particular business, for instance. In some embodiments, the incentive is sufficiently attractive to cause participants to compete for the incentive by trying to race each other to the creation of blocks. Each block (b) created in the blockchain may contain a record or transaction describing one or more addresses that receive an incentive, such as virtual currency, as the result of successfully mining the block (b).

Where two entities simultaneously create new blocks, the blockchain may develop a fork; the protocol may determine which of the two alternate branches in the fork is the valid new portion of the blockchain by evaluating, after a certain amount of time has passed, which branch is longer. "Length" may be measured according to the number of blocks in the branch. Length may be measured according to the total computational cost of producing the branch. The protocol may treat only transactions contained the valid branch as valid transactions. When a branch is found invalid according to this protocol, transactions registered in that branch may be recreated in a new block in the valid branch; the protocol may reject "double spending" transactions. As a result, in some embodiments the creation of fraudulent transactions requires the creation of a longer blockchain branch by the entity attempting the fraudulent transaction than the branch being produced by the rest of the participants; as long as the entity creating the fraudulent transaction is likely the only one with the incentive to create the branch containing the fraudulent transaction, the computational cost of the creation of that branch may be practically infeasible, guaranteeing the validity of all transactions in the blockchain. In some embodiments, where the algorithm producing the blocks (a-b) involves a cryptographic hash using a well-designed hashing algorithm, attempts to avoid the computational work necessary to create the hashes by simply inserting a fraudulent transaction in a previously created block may be thwarted by the "avalanche effect," whereby a small alteration of any data within the blockchain causes the output of the blockchain to change drastically; this means that alterations are readily detectable to any person wishing to validate the hash of the attempted fraudulent block.

In another embodiment, the transaction register (a) is an alternative chain. In one embodiment, an alternative chain is one or more blocks that are incorporated into a blockchain, by including at least one hash representing data in the alternative chain in at least one block in the blockchain that is mined; where the mathematical puzzle involved in creating the new block is the production of a new hash, the additional hash in the block may not affect the degree of difficulty, and thus miners are not put at a computational disadvantage incorporating the alternative chain. The alternative chain may be incorporated using one or more Merkle trees. The Merkle tree may be a structure containing a hash of each datum in the alternative chain as leaf notes, with each internal node containing a hash of all of its child nodes;

thus, by the avalanche principle, the root of a Merkle tree may be a hash that recursively represents all the data hashed in the Merkle tree, and thus a set of data in the alternative chain, so that incorporation of the root in a block in the blockchain amounts to incorporation of the data from the alternative chain that the Merkle tree represents. A miner may charge a fee for incorporating the alternative chain in a block the miner mines. In an embodiment, verification of a transaction filed in the alternative chain involves first locating the transaction in the alternative chain, verifying its digital signature, and verifying each hash between that location and the blockchain block (for instance by verifying each hash in the Merkle tree from the leaf corresponding to the transaction to the root), verifying the hash of the block incorporating the alternative chain, and then verifying the block up the blockchain as described above.

In some embodiments, the virtual transactions track currency in the form of crypto-currency. In one embodiment, a crypto-currency is a digital currency such as Bitcoin, Peercoin, Namecoin, and Litecoin. The crypto-currency may be decentralized, with no particular entity controlling it; the integrity of the crypto-currency may be maintained by adherence by its participants to established protocols for exchange and for production of new currency, which may be enforced by software implementing the crypto-currency. The crypto-currency may be centralized, with its protocols enforced or hosted by a particular entity. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. The mathematical puzzles may be the same as the algorithms used to make productions of blocks in a blockchain computationally challenging; the incentive for producing blocks may include the grant of new crypto-currency to the miners. Quantities of crypto-currency may be exchanged using crypto-currency transactions as described above.

In some embodiments, the owner of crypto-currency keeps his or her currencies in a crypto-currency wallet, which is defined as any facility that stores crypto-currency. The storage of crypto-currency may be the storage of the public and private keys associated with crypto-currency received by the owner. In some embodiments, the user stores the crypto-currency in a virtual wallet, which is located at what amounts to a "crypto-currency bank"; the virtual wallets are exchanges and firms that are located through the Internet. The virtual wallets may accept fiat as payment and provide the user with crypto-currency or other chosen crypto-currencies to hold within their virtual account. In other embodiments, the user keeps crypto-currency in a local wallet, which is a storage device (i.e. hard drive, memory device) that the user can physically move and store in any manner he or she wants. If a user with a local wallet wants to use his or her crypto-currency the user must hook it back up to a computer device that has wallet software on it and then he or she can move the crypto-currency around. In other embodiments, the user keeps crypto-currency in a physical wallet that stores one or more addresses associated with the crypto-currency in physical form, in addition to the corresponding private keys permitting expenditure as described below, such as a paper wallet in which a user prints out his or her crypto-currency from his or her local wallet storage device or his or her virtual wallet. A paper wallet may be a piece of paper with one or more QR codes on it that, once scanned, can be put on a local or virtual wallet or spent by scanning the QR codes right into a point of sale system. A physical wallet may keep the private and public keys associated with crypto-currency in any code readable by a code scanner as described above.

Wallets may have "cold storage" or "hot storage." Since the rampant hacking and stealing of Bitcoin wallets that has been done firms have created "cold storage." "Cold storage" is storage of one's crypto-currency in a location that is not connected to the Internet and sometimes is not even located where virtual wallets are kept. Virtual wallets refer to "hot storage" or "hot wallet" as a term that their contents are exposed to hackers via the virtual wallets. These "hot wallets" are full of coins being used. References to hot and cold wallets are now main-stream for wallet companies. The ratio of hot to cold wallets is usually 10% or 20% hot and 80% to 90% cold. The transfer either virtually or physically back and forth between the wallets internally to have security confidence. In the end, all kinds of crypto-currency wallets may be place to store private and public keys, confirmed by the blockchain, but equate to funds or fiat currency.

In some embodiments, the private keys associated with transactions are maintained in a private register. The private register may include a data store or data structure permitting the first computing device to retrieve private keys rapidly. The private register (b) may include a database as described above. The private register may include public keys as well; the private register may link the public keys to their corresponding private keys. The private register may include certificates, or information required to create certificates, from one or more certificate authorities that issued private and public keys in the private register; the private register may link certificates or information for creating certificates to the corresponding private or public keys. Persons skilled in the art will be aware of many ways to link one datum to a related datum; for instance, a private key, its corresponding public key, and information identifying an issuing certificate authority may be three cells in a database row in a database included in the private register, so that retrieval of the row using a query specifying any of the three, or a set of data containing any of the three, will produce the other two. The private register may contain additional data; for instance, the private register may contain records describing transactions involving each private or public key, information identifying the entities involved in the transactions, or information identifying the address to which the transactions were conveyed.

In one embodiment of the present disclosure, a blockchain can be accompanied with or built upon through one or more side blockchains. These side blockchains can each originate or emanate from a given block or entry within a blockchain and extend outwards such that the original blockchain contains many different end points. For example, a blockchain may contain five blockchains wherein (1) is an entry for the raw materials of a given part/product, (2) is an entry for the processing of the given part/product, (3) is the processing entity of the given part/product, (4) is a patent associated with the part/product, and (5) is the cost paid to the processing entity. A new blockchain could be added to blockchain 1 identifying the supplier of the raw materials, or a new blockchain could be added to blockchain 3 indicating a certification of the machinery performing the processing on the given part/product. Accordingly, embodiments provide that rather than simply adding blockchains to the end of the fifth blockchain, new blockchains can be added from any one of these five blockchains thereby providing information relevant to that specific blockchain.

In another example, a given part/product may be represented by a main blockchain having multiple blocks, wherein each block in the blockchain is associated with a piece of the given part/product. Each piece may have been supplied from a different supplier and each piece may have its own associated product information, such as its different raw materials, different processes of manufacture, different intellectual property embodied therein, and different costs. In this regard, each block in the main blockchain can be associated with a piece of the given part/product and side blockchains can extend outward from the main blockchain representing that particular pieces product information.

Figure 2:
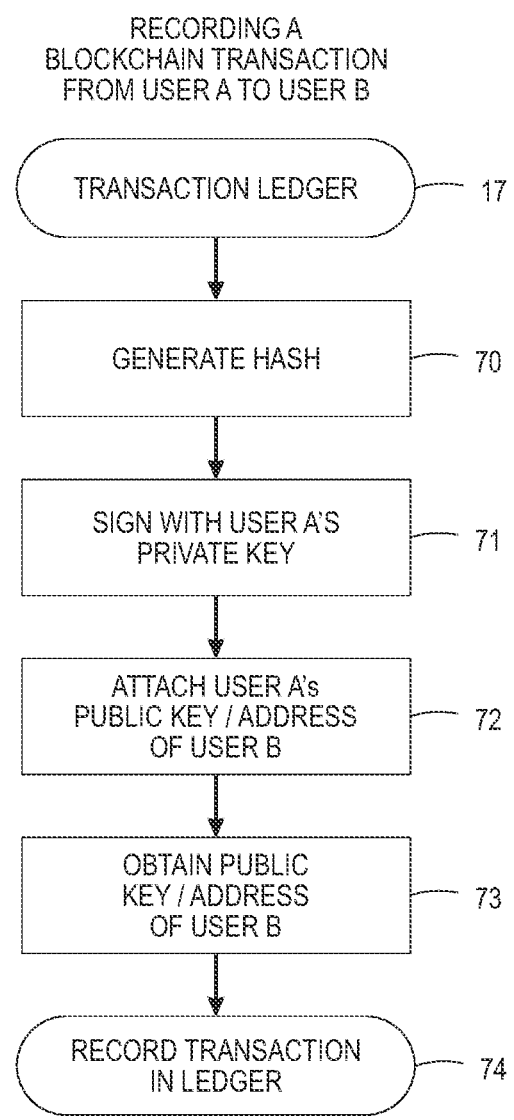
FIG. 2 is a flowchart disclosing the method steps of an embodiment for recording a transaction in a digital ledger.

In the embodiment illustrated in FIG. 2, a blockchain transaction from a first user A to a second user B is recorded in the ledger 17 by first generating a hash 70. The first user A then signs the hash with the first user's private key 71. The first user's public key and the address of the second user B is attached 72. The public key and address of the second user B is obtained 73 and the transaction is recorded in the ledger 74.

Virtual Distributed Ledger System with Traceability Overview.

Turning now to FIGS. 1-34, and in particular FIGS. 1-5B, the present disclosure comprises a system 15 for transparently and securely capturing the satisfactory completion of individual process steps of an additively manufactured part 135 (sometimes known as 3D printing), as the part moves through its processing steps from at least requirements definition to delivery of the final part to the end customer or user 29. Major process steps of record for a newly printed additively manufactured part can be thought of as a virtual inventory or ledger transaction, where block data is pulled from virtual inventory, transformed within the given process step to a new state, and returned to inventory after successful completion of the given process step at the new state which is recorded in the ledger 17. While the present disclosure focuses on an example of an additive manufactured part, substantially the same or similar process steps can also apply to a traditionally (or subtractive) manufactured part.

Each virtual inventory transaction is recorded in a public, private or semi-private blockchain ledger as a transparent, secure and traceable means to prove successful process completion, state change, and authenticity at each inventory point. Major process steps and states of record for a repeat printed additively manufactured part are described below. In this case the original traceable source data fed to the additive manufactured part can be successively reused to generate repeat parts, with the transactions recorded in the blockchain ledger 17. Provenance, authenticity and traceability to source requirements are thus maintained in serial production.

The present disclosure applies blockchain technology to support an all-digital workflow, such that an end user 29 may print a licensed part on his or her certified printer 31, following certified processes to produce final serviceable goods or replacement parts 135 that are fully traceable and can be validated to the original customer 19 and manufacturer requirements 37. Unique identifying transaction identifiers 129 (such as using QR codes representing process hashes) can be encoded within or upon the printed part 135, or otherwise marked during the process steps as needed. This can be achieved in the manufacturing process or through laser marking after successful final inspection, for example.

A preferred embodiment of the disclosure allows for traceability of a part to source requirements in additive manufacturing. This is accomplished by breaking the traceability chain into modules whose location within the supply chain can be reused and globally transported as needed to suit the end user needs within an all-digital workflow.

The disclosed virtual distributed inventory management or ledger system 15 utilizes a plurality of major process steps leading to different states of the subject part in question, represented in the attached figures as blocks. All major process steps represent work to be performed, with inputs into the process and states that are transformed by the process to form work outputs of the process from one step to the next, as shown and discussed in detail below. Completion of a process step and transfer to the next step are defined as virtual transformations.

The process/state management system of the disclosed virtual ledger system 15 maintains a traceability record through a series of transactions 90 permanently sequenced and recorded in a digital transaction ledger 17, such as a blockchain or other public ledger system on a transparent distributed server network 16. Security and authenticity of transactions are enabled and enforced through public-private passkeys used to encrypt and record transactions in a manner that cannot be forged.

Transactions can include one or more inputs, and one or more outputs, in addition to a signature of the process owner, each of which can be independently certified and traced as authentic and approved. Completion of a process step and transfer of ownership to the next process step and state change are defined and recorded by the digital transaction ledger transaction record. For instance, transactions may be recorded and time stamped within a blockchain located on a transparent distributed blockchain server network 16, forming a permanent, immutable and traceable transaction record for a 3D-printed part 135.

The final produced part 135 as delivered 60 to the end use 29 preferably encodes a final unique transaction ID 129 upon and/or within the part 135. This transaction ID 129 is in a form such that it can be readily inspected to inform the end user 29 of the authenticity of the part 135 in addition to the compliance of such part's manufacturing history. Dependent on the manufacturing method, a hidden ID can also be imparted to further guarantee authenticity and detect counterfeits. Knowledge of this transaction ID and a query of the transparent blockchain ledger 17 enable full provenance and backward traceability of the part transactions, thereby guaranteeing provenance, authenticity, compliance to requirements, and suitability for end use.

Process States.

With reference to FIGS. 4-17, the major process states 50-60 that are tracked by a disclosed embodiment of the virtual distributed inventory management system 15 for an additive manufacture part include at least the following distinct states, each of which may have its own corresponding inputs and outputs (as shown in FIGS. 8, 9, 13, 14, 15, 18, 19, 22, 23, 26 and 27), and each of which may have its own associated transaction recorded to the digital ledger: customer requirements 50, design implementation requirements 51, manufacturing pre-processing 52, powder procurement and stocking 53, machine calibration parameter generation 54, powder inspection process 55, machine pre-processor transformation 56, 3D printing 57, part post processing 58, part post inspection 59, and part end user delivery 60.

Customer Requirements State.

Figure 6:
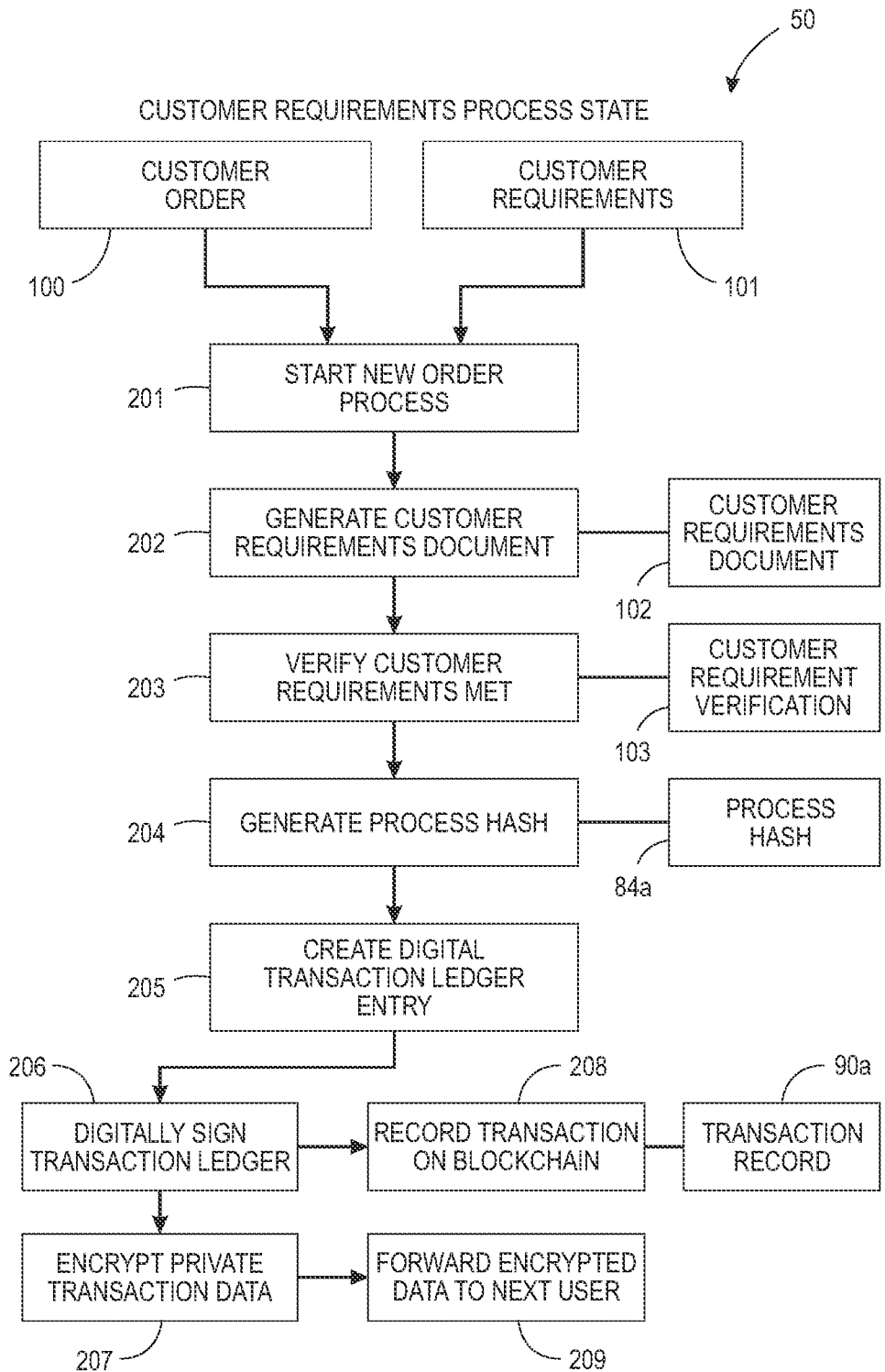
FIG. 6 is a flowchart disclosing the method steps of an embodiment of the customer requirements process state.

Referring to FIGS. 6 and 8, the customer requirements process state 50 begins with receipt of a customer order 100 and a set of customer requirements 101. The customer requirements 101 may be a comprehensive list of specifications and quality controls that are required of a part manufacturer. A first user of the virtual distributed inventory management system 15 takes the customer order 100 and customer requirements 101 and starts a new order process 201. The user generates an internal customer requirements document 202, and digitally signs the transaction ledger 206 and records 208 a first transaction 90*a* in the digital ledger 17 attesting that the customer requirements document 102 has been created. Upon recordation 208 of this first transaction, the process state is virtually transformed to the subsequent state, which is the design implementation requirements process state 51.

With further reference to FIG. 6, the recording of a transaction may include, for example, verifying that the customer requirements have been met 203 and generating a process hash 204 using the customer requirements, creating a digital transaction ledger entry 205, and signing such hash with a private key 82 of an individual signing the customer requirements state transaction, and recording this transaction information onto the digital ledger at a specified address. The specific transaction information recorded onto the digital ledger 17 may include the above-mentioned process hash 84*a* alone, or may also or alternatively include certain information derived from the customer requirements, such as a part serial number 113 and a part model number 114, as will be further described below with reference to subsequent process states. Private transaction data may be encrypted 207 and forwarded to the next user 209.

Alternatively, the transaction may be recorded via a cryptocurrency transaction, with a first user associated with a first process state transferring a nominal amount of cryptocurrency to a second user associated with a second process state, along with a unique transaction identifier. For instance, a first user associated with the customer requirements state and in charge of generating the customer requirements document may confirm that this process is completed by transferring a nominal amount of Bitcoins to a second user associated with the design implementation requirements state, while affixing the above-referenced customer requirements hash to the Bitcoin transaction's OP_RETURN opcode.

Design Implementation Requirements State.

Figure 7:
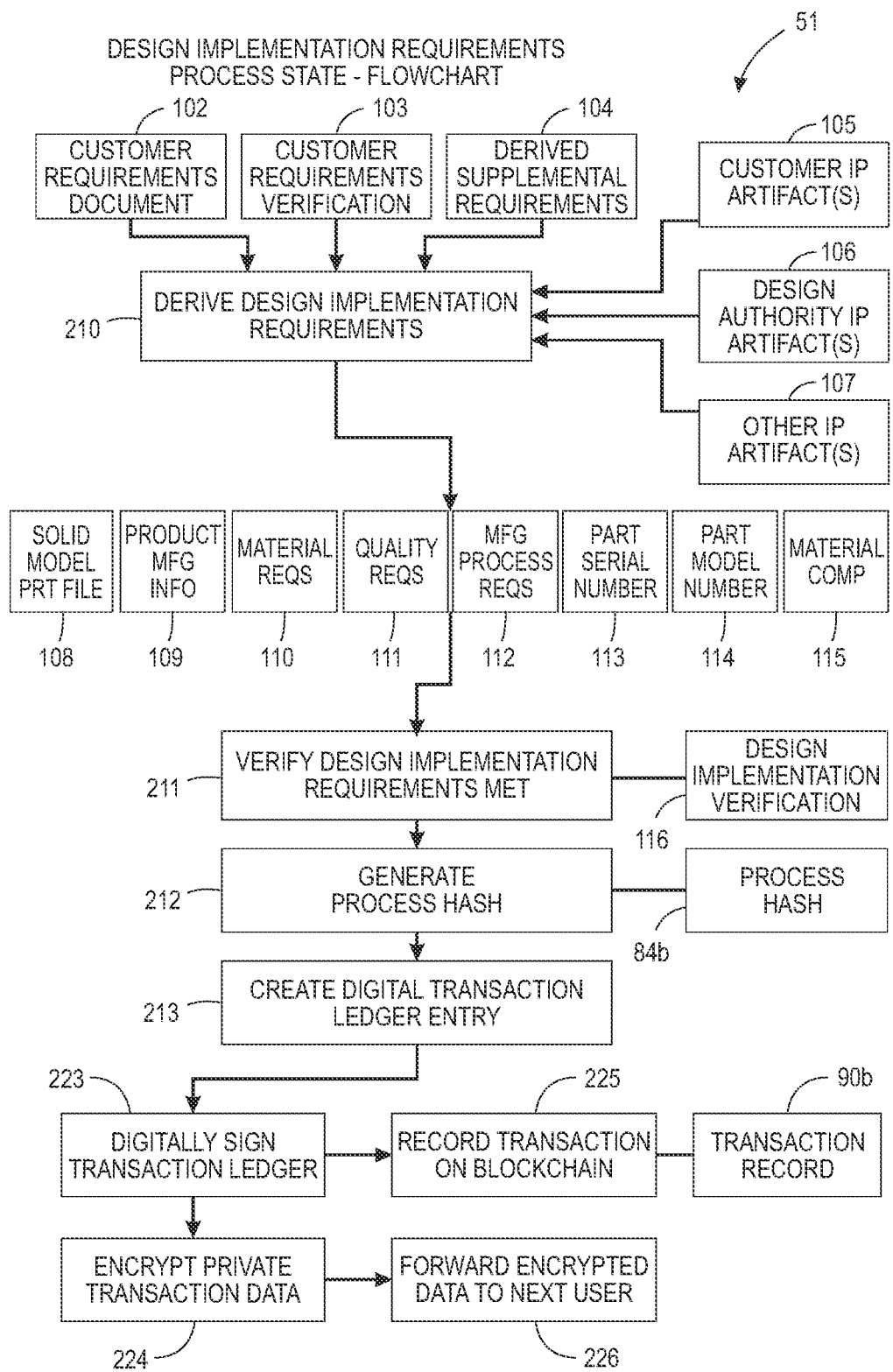
FIG. 7 is a flowchart disclosing the method steps of an embodiment of the design implementation requirements process state.

Turning to FIGS. 7 and 9, once the customer requirements process state 50 has been certified via the above referenced transaction data being recorded 208 to the digital ledger 17, the virtual transformation enters the design implementation requirements state 51. Accepted as inputs at this state are the previous state's output 102 of the customer requirements document step 202, in addition of any supplemental derived requirements 104 that may be specific to the manufacturer. For instance, the manufacturer may have its own sets of product specifications and quality controls above and beyond those required by a customer and outlined in the customer requirements document 102. Further inputs may include the customer requirements verification 103 from the verification process step 203 and any intellectual property rights or artifacts, such as customer IP artifacts 105, design authority intellectual property artifacts 106 and third party IP artifacts 107.

From the customer requirements 102 and any supplemental requirements 104, together with any customer requirements verification 103 and IP rights 105, 106 and 107, at least the following pieces of information 37 are preferably produced or derived 210 at the design implementation requirements state: a geometry definition and solid model of the part 108, for example in the form of a file format of a CAD program which creates design parts and assembly processes, such as a PRT file of PTC Pro/Engineer; product manufacturing information 109, such as of the size, weight, strength, or geometry of a part; material requirements 110, such as material composition 115, including without limitation aluminum (AlSi10Mg), titanium (Ti 6Al4V), cobalt chrome, inconel 625 & 718, maraging steel (MS1), stainless steel (15-5PH, 17-4PH, 316L), hastalloy-X, copper C18150 and aluminum Al7000, and mixture ratio thereof for additive manufacturing material mixtures; quality requirements 111, such as resolution and tolerances; manufacturing process requirements 112, such as additive printer machine make and/or model; part model number 114; and part serial number 113.

Similar to the customer requirements process state 50, certification of the design implementation requirements process state preferably concludes with the recording 216 of a transaction 90*b* in the digital ledger such as a blockchain 17. For example, the recording of a transaction may include, verifying that the design implementation requirements have been met 211 and generating 212 a process hash 84*b* using the design implementation requirements and the customer requirements as inputs, creating a digital transaction ledger entry 213, signing the hash 214 with a private key 82 of an individual signing the design implementation requirements state transaction, and recording this transaction information onto the digital ledger 17 at a specified address. Private transaction data may be encrypted 215 and forwarded to the next user 217.

In order to facilitate the tracking of a specific part through its entire product lifecycle, it is preferable that the design implementation requirements state transaction 90*b* also reflects the previous customer requirements state transaction 90*a*. This can be accomplished a number of different ways, for instance, if a unique part serial number and part model number was generated and recorded in the customer requirements state transaction 50, the same part serial number 113 and part model number 114 can be used when recording the design implementation requirements state transaction 90*b*. Alternatively, the design implementation requirements state transaction 90*b* can refer to the previous transaction 90*a* by including reference to the address at which the previous transaction is recorded on the digital ledger 17. In a case where a cryptocurrency transaction was used to mark the recording of the customer requirements state transaction 50, then the certifier of the design implementation requirements process state will simply transfer the same nominal amount of cryptocurrency received by the customer requirements process state certifier, affix the newly generated design implementation requirements process hash 84*b* to the transaction, and send the cryptocurrency to the next user or users associated with the manufacturing pre-processing requirements state.

Manufacturing Pre-Processing Requirements State.

Figure 10:
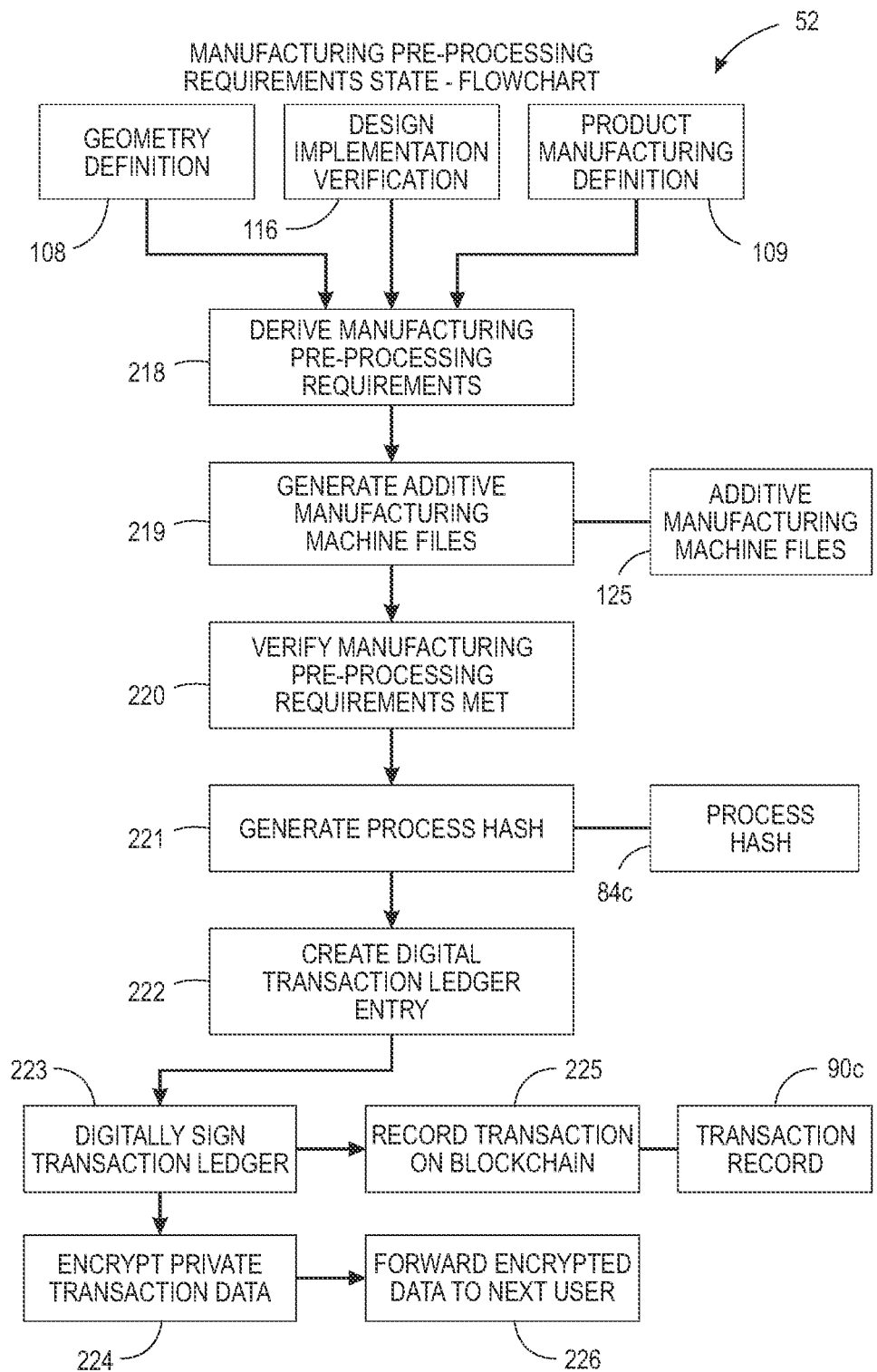
FIG. 10 is a flowchart disclosing the method steps of an embodiment of the manufacturing pre-processing requirements process state.

Referring to FIGS. 10 and 13, the manufacturing pre-processing requirements state 52 begins with receipt of at least certified computer aided design geometry files 108, such as a solid model PRT file having a 3D geometry definition, in addition to product manufacturing information 109, such as the size, weight, strength, or geometry of a part. This information will be used to generate 219 as an output a file or set of files 125 that can be read by a 3D printer 31, such as stereolithography file (STL), additive manufacturing file (AMF), or other similar file format. Further inputs may include the customer requirements verification 116 from the verification process step 211.

Certification of the manufacturing pre-processing requirements process state 52 preferably concludes with the recording of a transaction 90c in the digital ledger 17. For example, the recording of a transaction may include deriving the manufacturing pre-processing requirements 218, generating 219 additive manufacturing files 125, verifying that the manufacturing pre-processing requirements have been met 220 and generating 221 a process hash 84c using any desired combination of the manufacturing pre-processing requirements, the design implementation requirements 37 and the customer requirements 101 as inputs, creating a digital transaction ledger entry 222, signing the hash 223 with a private key 82 of an individual signing the manufacturing pre-processing requirements process state transaction, and recording this transaction information 90c in the digital ledger 17 at a specified address 225. Private transaction data may be encrypted 224 and forwarded to the next user 226.

Similar to the process described with respect to the customer requirements, the specific transaction information recorded onto the digital ledger 17 may include the above-mentioned process hash 84c alone, or may also or alternatively include certain information derived from any of the customer requirements, design implementation requirements, or manufacturing pre-processing requirements, such as a part serial number 113 and a part model number 114. Alternatively, a state transformation can take place via a cryptocurrency transaction as described above.

Powder Procurement and Stocking Process State.

Figure 11:
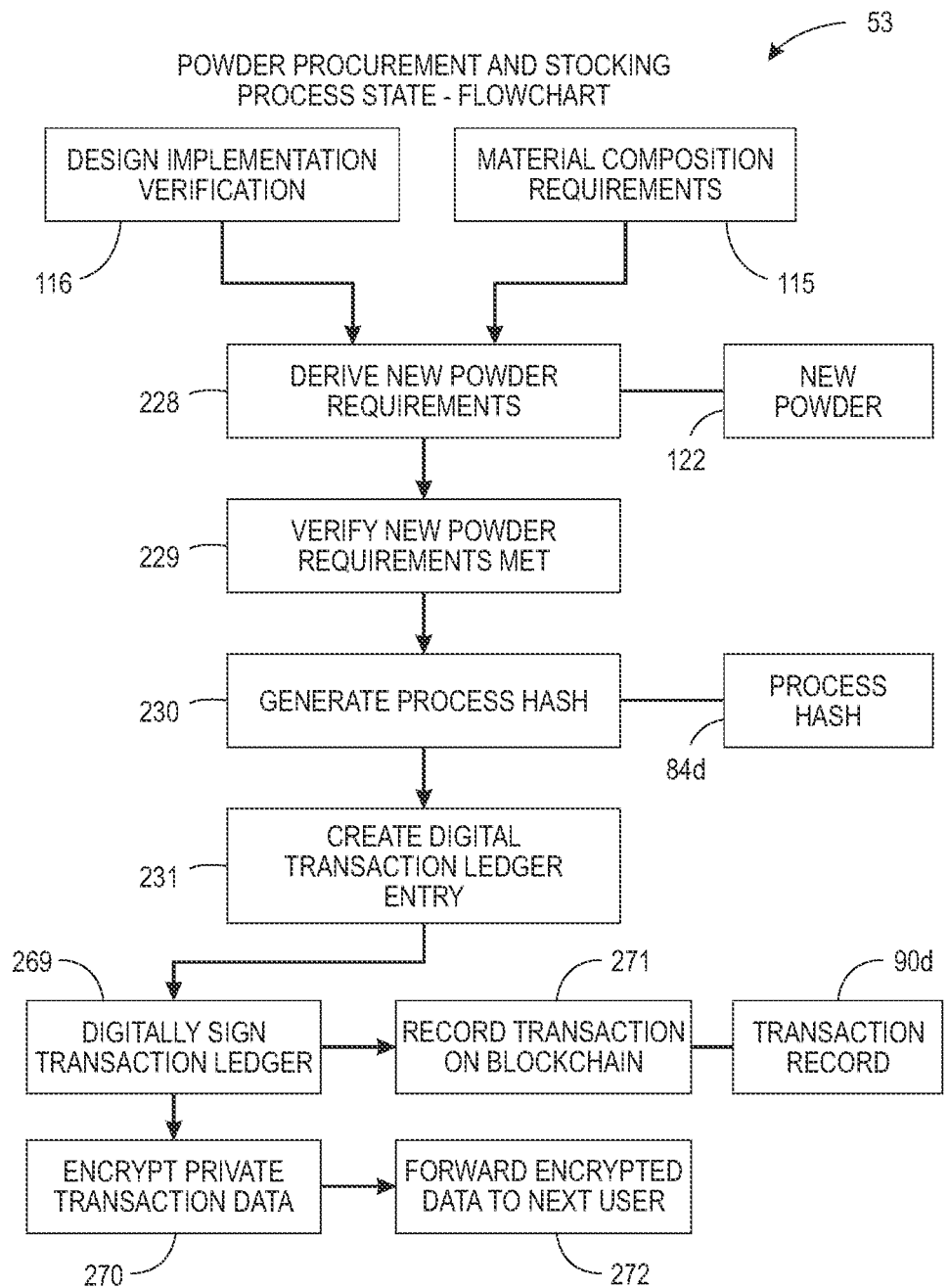
FIG. 11 is a flowchart disclosing the method steps of an embodiment of the powder procurement and stocking process state.

Turning to FIGS. 11 and 14, after the manufacturing pre-processing requirements have been certified as completed, the system transforms to the powder procurement and stocking process state 53. The material composition parameters 115 generated from the previous process state 51 are received, and such parameters are preferably used to generate 228 new powder requirements 122 to be sent to the 3D printer 31.

Certification of the powder procurement and stocking process state preferably concludes with the recording 234 of a transaction 90d in the digital ledger 17. For example, the recording of a transaction may include verifying that the new powder requirements have been met 229, generating 230 a process hash 84d using any desired combination of the powder procurement and stocking requirements, the manufacturing pre-processing requirements, the design implementation requirements and the customer requirements as inputs, creating a digital transaction ledger entry 231, signing such hash 232 with a private key 82 of an individual signing the powder procurement and stocking process state transaction, and recording this transaction information in the digital ledger 17 at a specified address. Private transaction data may be encrypted 233 and forwarded to the next user 235. As will be readily evident with respect to any and all of the process states, the transaction log 17 may include the process hash 84 alone, or may include reference to any of the specific information derived thus far throughout the process.

Machine Calibration Parameter Generation State.

Figure 12:
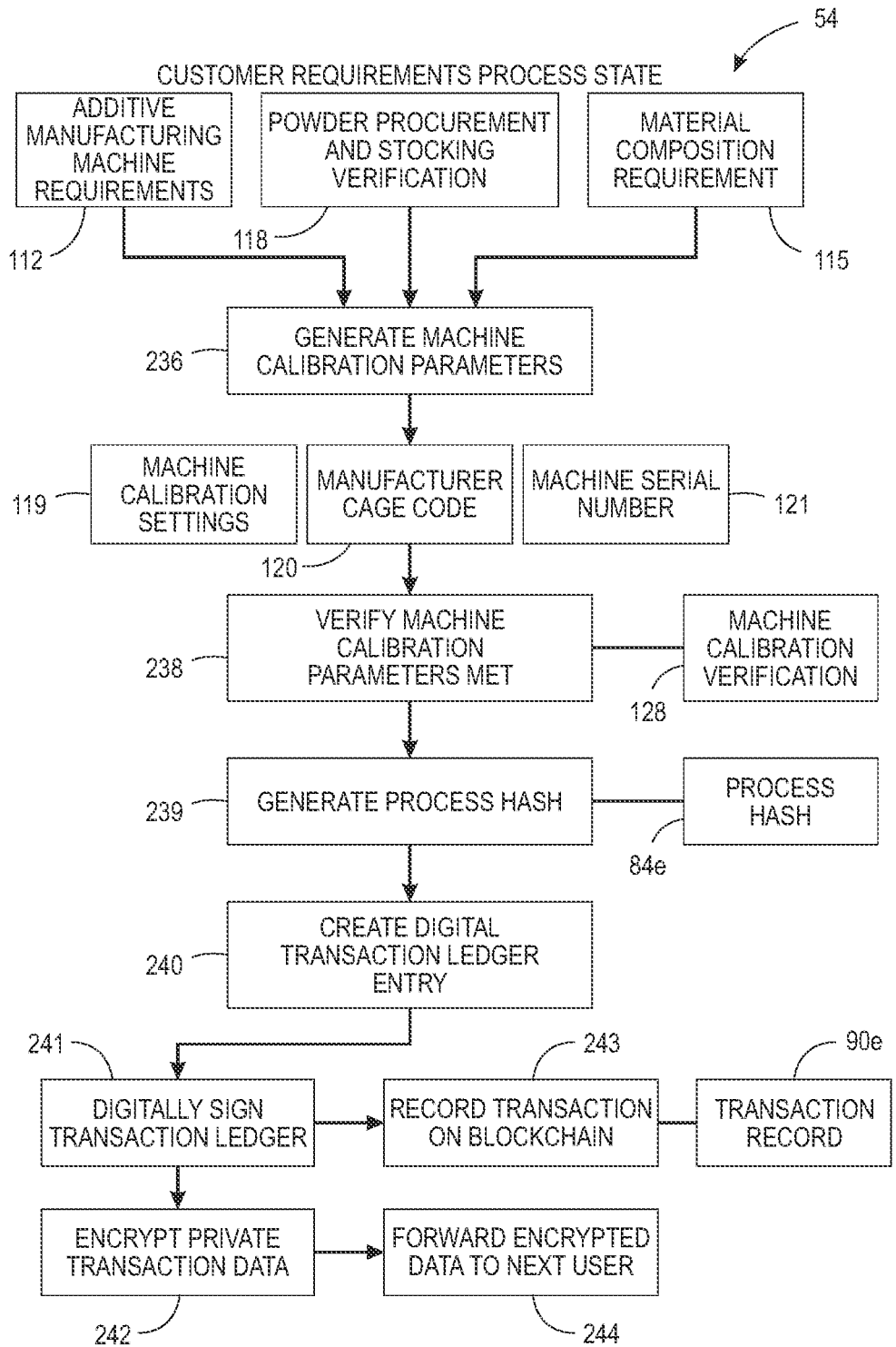
FIG. 12 is a flowchart disclosing the method steps of an embodiment of the machine calibration parameter generation process state.

Referring now to FIGS. 12 and 15, coincident with or after certification of the power procurement and stocking process state 53, the disclosed method virtually transforms to the additive manufacturing machine calibration parameter generation state 54. By receiving the material requirements 115 and the manufacturing pre-processing requirements 112, a user is able to generate, for example, specific machine calibration settings 119, such as specific composition of materials, melting point, powder size, powder purity, bulk density, or Reynolds' dilatancy; a required machine serial number used for manufacturing 121; and a manufacturer Commercial and Government Entity (CAGE) code 120.

Certification of the machine calibration parameter generation state preferably concludes with the recording 243 of a transaction 90e in the digital ledger 17. For example, the recording of a transaction may include verifying that the machine calibration parameters have been met 238, generating 239 a process hash 84e using any desired combination of the derived machine calibration parameter generation requirements, the powder procurement and stocking requirements, the manufacturing pre-processing requirements, the design implementation requirements and the customer requirements as inputs, creating a digital transaction ledger entry 240, signing such hash 241 with a private key 82 of an individual signing the subject state transaction, and recording this transaction information in the digital ledger 17 at a specified address. Private transaction data may be encrypted 242 and forwarded to the next user 244.

Powder Inspection Process State.

Figure 16:
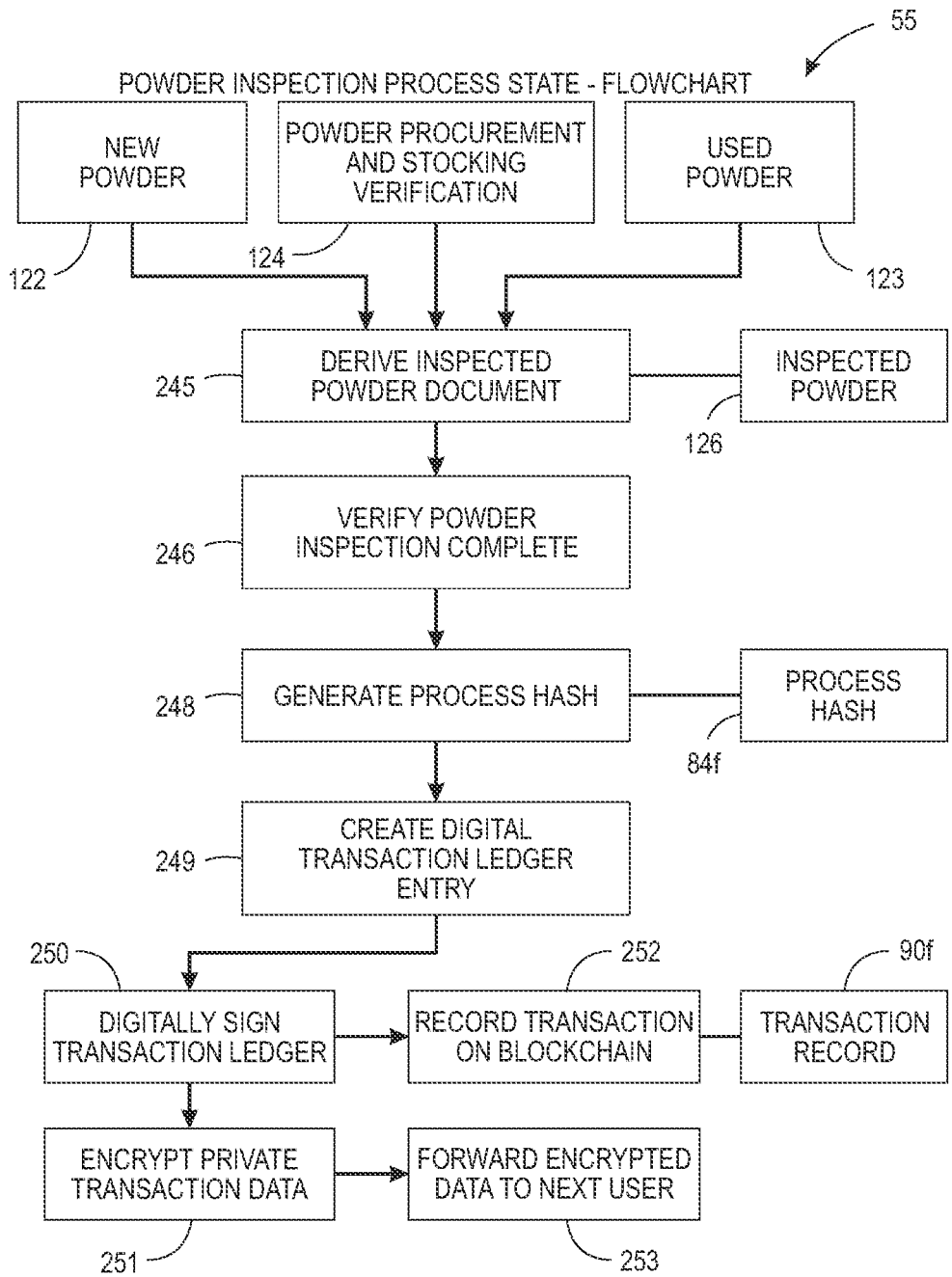
FIG. 16 is a flowchart disclosing the method steps of an embodiment of the powder inspection process state.

Now referring to FIGS. 16 and 18, after the powder procurement and stocking process has been certified, the system transforms to the powder inspection process state 55. New powder requirements 122 from processing state 53 are combined with the known used powder left over from previous additive manufacturing machine calibrations 123 in order to certify that machine powder has been inspected 245. In this respect, a manufacturer will be able to track the precise amount of powder that is used throughout the generation of multiple parts, which may be useful for tracking the quantity of parts printed. As with the previous states, certification of the powder inspection process state 245 is preferably accomplished via the recording 252 of a transaction 90f in the digital ledger 17 in a manner similar to that described above.

For example, the recording of a transaction may include verifying that the powder inspection has been completed 246, generating 248 a process hash 84f using any desired combination of the derived machine calibration parameter generation requirements, the powder procurement and stocking requirements, the manufacturing pre-processing requirements, the design implementation requirements and the customer requirements as inputs, creating a digital transaction ledger entry 249, signing such hash 250 with a private key 82 of an individual signing the powder inspection state transaction, and recording this transaction information in the digital ledger 17 at a specified address. Private transaction data may be encrypted 251 and forwarded to the next user 253.

Product Identifier Creation.

Figure 29:
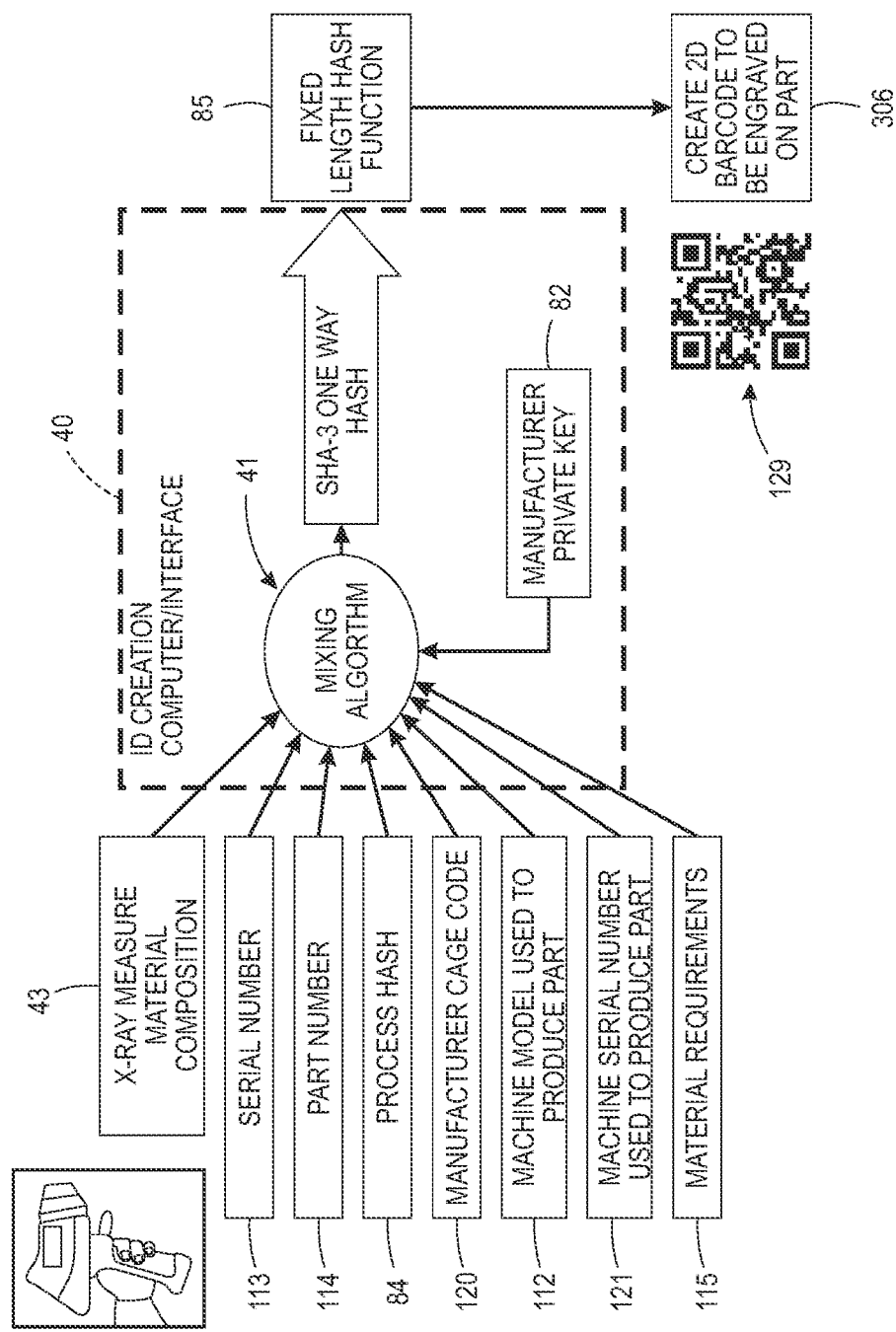
FIG. 29 is a schematic diagram showing an embodiment of a unique part identifier generation for the disclosed virtual distributed ledger system.
Figure 30:
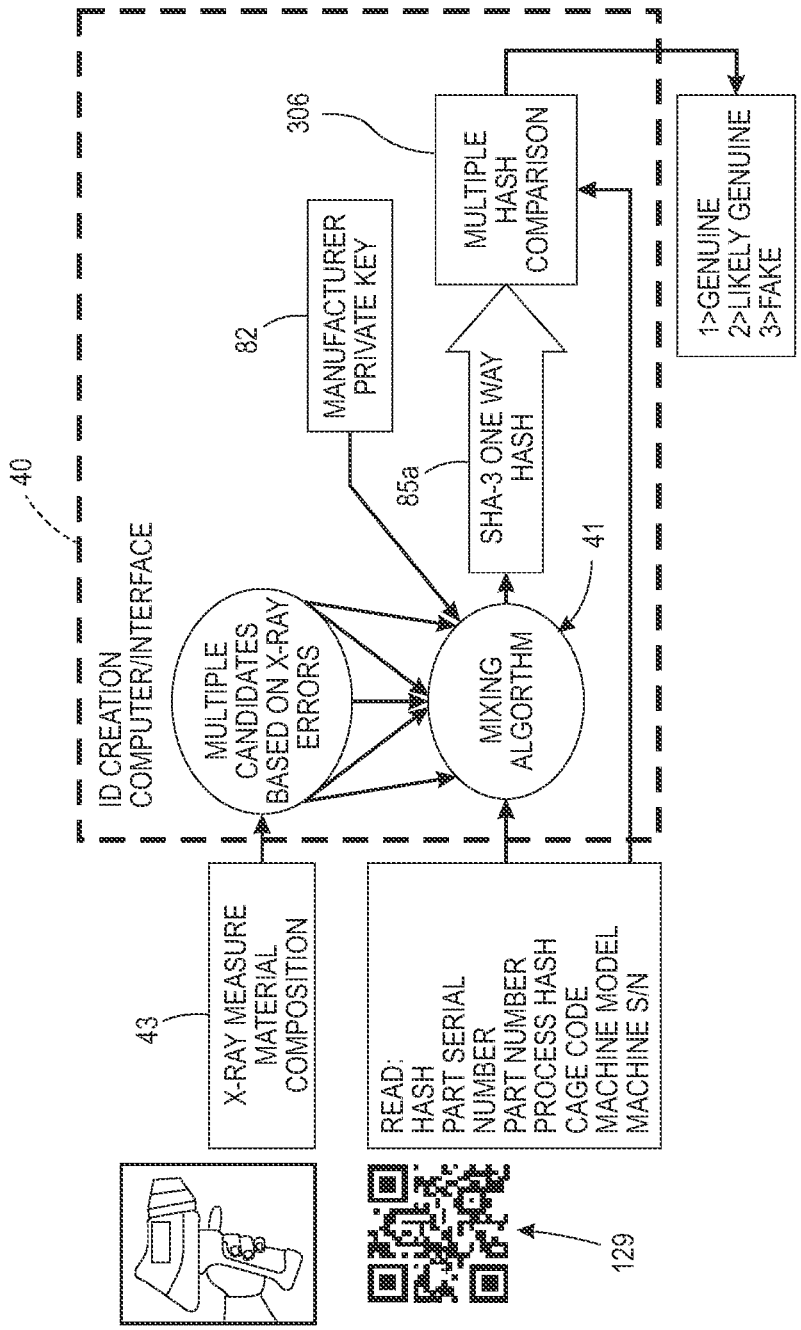
FIG. 30 is a schematic diagram showing an embodiment of a part authentication method for the disclosed virtual distributed ledger system.

As illustrated with respect to FIG. 29, at this stage of the process, all manufacturing requirements that are necessary for an additive manufacturer to print the part have been derived and certified. However, prior to that process state being transformed to the printing stage, it is desired that the derived part specifications be used to create 306 a unique part ID number, which may be used for authentication purposes, as described below in further detail. For instance, a unique part ID number may be created via a ID creation computer interface 40 by generating a process hash 85 using as inputs the part serial number 113, the part model number 114, the derived manufacturing process requirements 112, the machine serial number to be used for additive manufacture 121, a process hash 84a-f from any of the previous process states, the part material composition requirements 115, and the manufacturer CAGE code 120. From the resulting unique ID, a 2D or 3D bar code or glyph 129 can be generated for future etching onto the final additive manufactured part, or printed directly into the part. Additionally, a certificate of authenticity 305 can be generated at this stage, containing the unique part ID number and reference to any of the above mentioned details specific to this part. Further, certification of a unique product identifier is preferably accomplished via the recording of a transaction in the digital ledger 17 in a manner similar to that described above.

Machine Pre-Processing Transformation State.

Figure 17:
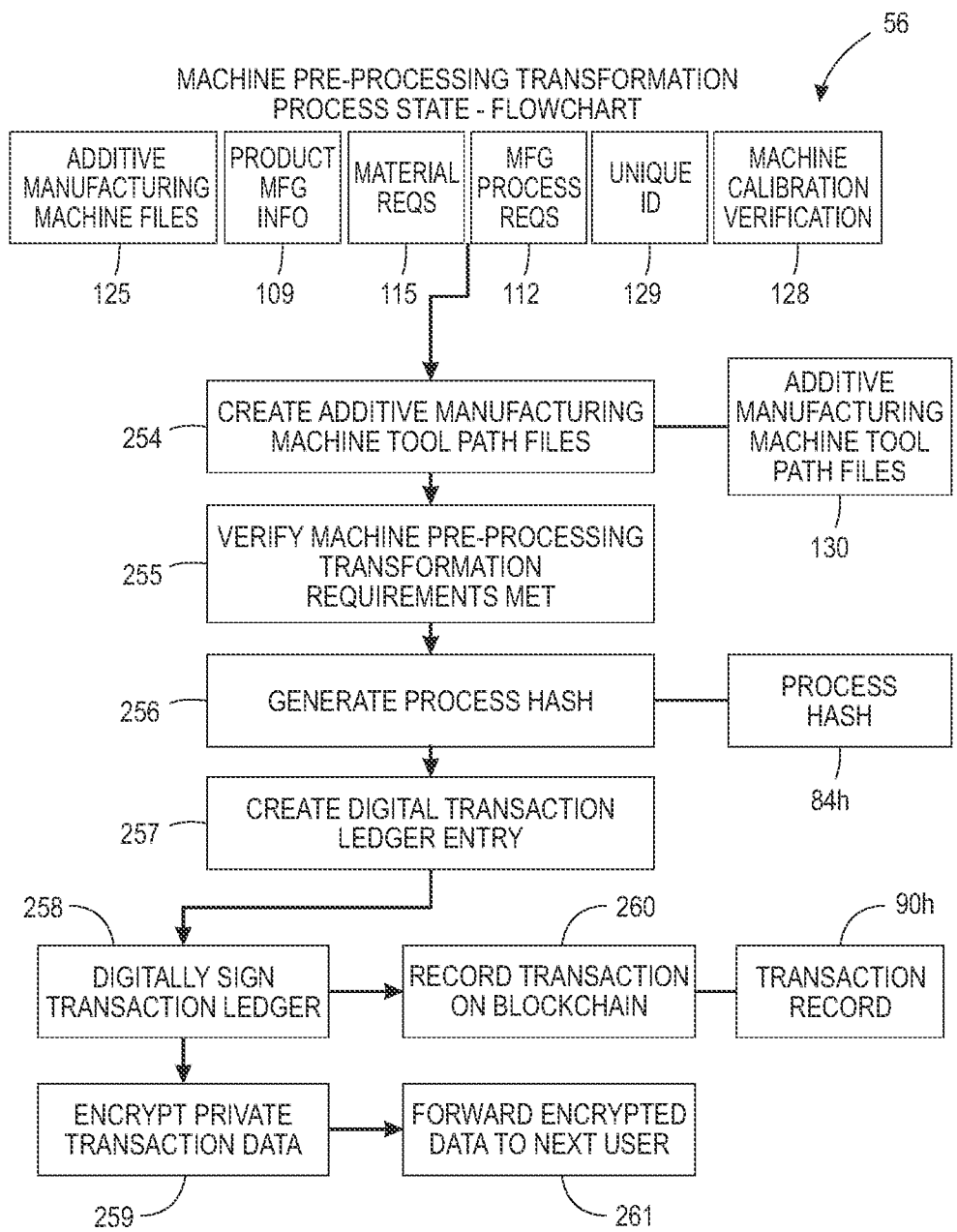
FIG. 17 is a flowchart disclosing the method steps of an embodiment of the machine pre-processing transformation process state.

Turning to FIGS. 17 and 19, once all of the previous states have been certified as complete, the process is ready to proceed to the additive manufacturer, beginning with the machine pre-processing transformation state 56. Accepted as inputs at this stage are the STL file, AMF file, or other equivalent file 125 previously generated in the manufacturing pre-processing requirements state 52; product manufacturing information 109; material requirement/composition information 115; manufacturing process requirements 112, such as specific additive manufacturing machine model; and the unique 2D or 3D bar code or part glyph 129. All are preferably used to create 254 an additive manufacturing machine tool path file 130, which will describe such things as the speed, power, scan rate, scan pattern, and feed rate of the 3D printer 31. As with the previous states, certification of the machine pre-processing transformation process state 56 is preferably accomplished via the recording 260 of a transaction 90$h$ in the digital ledger 17 in a manner similar to that described above.

For example, the recording of a transaction may include verifying that the machine pre-processing transformation requirement has been met 255, generating 256 a process hash 84$h$, creating a digital transaction ledger entry 257, signing such hash 258 with a private key 82 of an individual signing the machine pre-processing transformation state transaction, and recording this transaction information onto the digital ledger 17 at a specified address. Private transaction data may be encrypted 259 and forwarded to the next user 261.

3D Print Part State.

Figure 20:
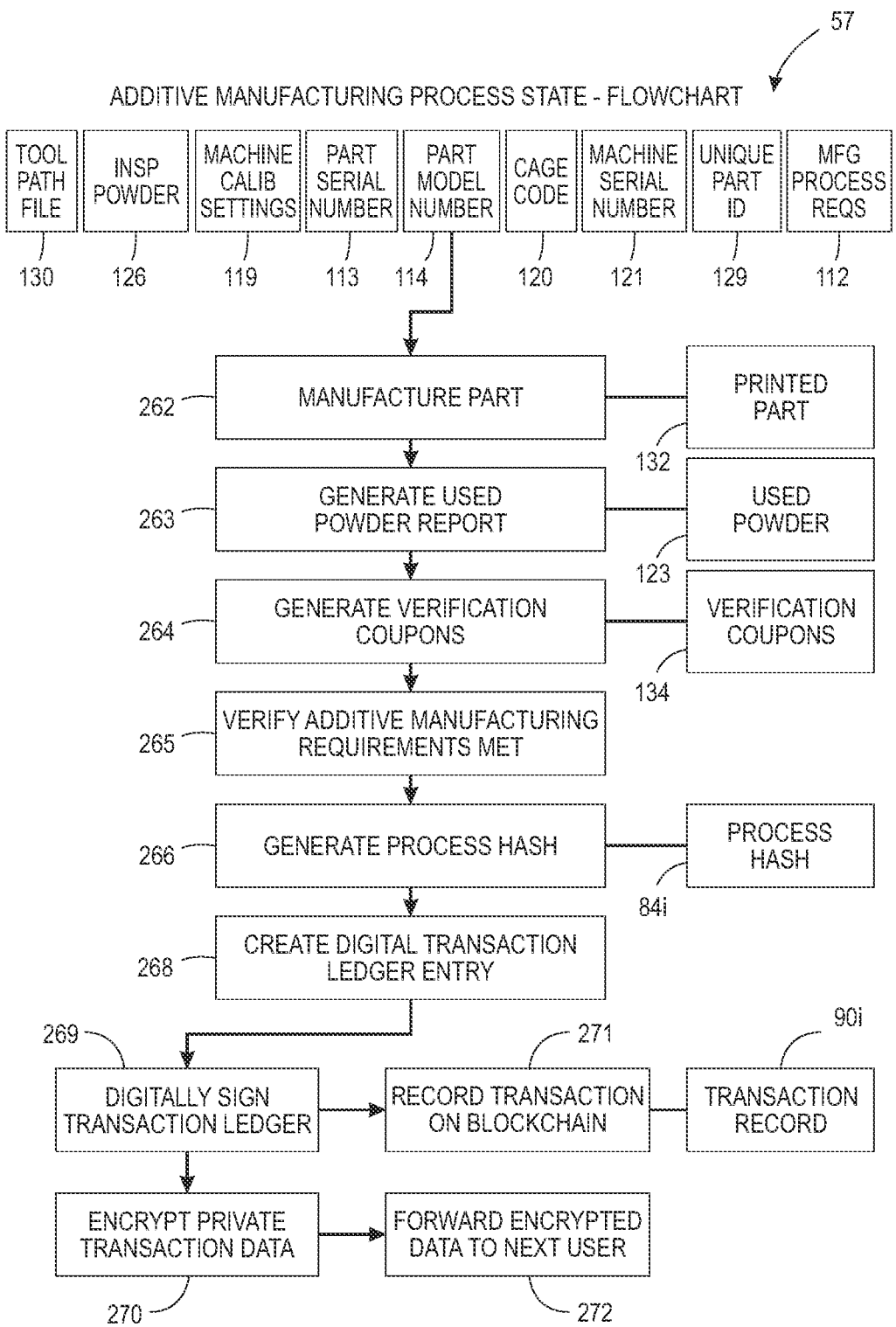
FIG. 20 is a flowchart disclosing the method steps of an embodiment of the additive manufacturing process state.

Now referring to FIGS. 20 and 22, all part design requirements having now been certified, in the additive manufacturing process state 57 the representative part is now ready to be printed 262 on a 3D printer 31. An additive manufacturer will preferably receive the derived machine tool path file 130, the inspected powder certification 126, the additive manufacture machine calibration settings 119, the part model number 114, the part serial number 113, the manufacturer CAGE code 120, the machine serial number 121 used for manufacturing, the manufacturing process requirements 112, and the unique 2D or 3D bar code or part glyph 129. Once a piece part 132 is printed, the 3D print part state additionally calls for the generation 263 of a used powder report 123 and generation 264 of piece part verification coupons 134. As with the previous states, certification of the 3D print part process state 57 is preferably accomplished via the recording 271 of a transaction 90$i$ in the digital ledger 17 in a manner similar to that described above.

For example, the recording of a transaction may include verifying that the additive manufacturing requirements have been met 265, generating 266 a process hash 84$i$, creating a digital transaction ledger entry 268, signing such hash 269 with a private key 82 of an individual signing the subject state transaction, and recording this transaction information in the digital ledger 17 at a specified address. Private transaction data may be encrypted 270 and forwarded to the next user 272.

Part Post Processing State.

Figure 21:
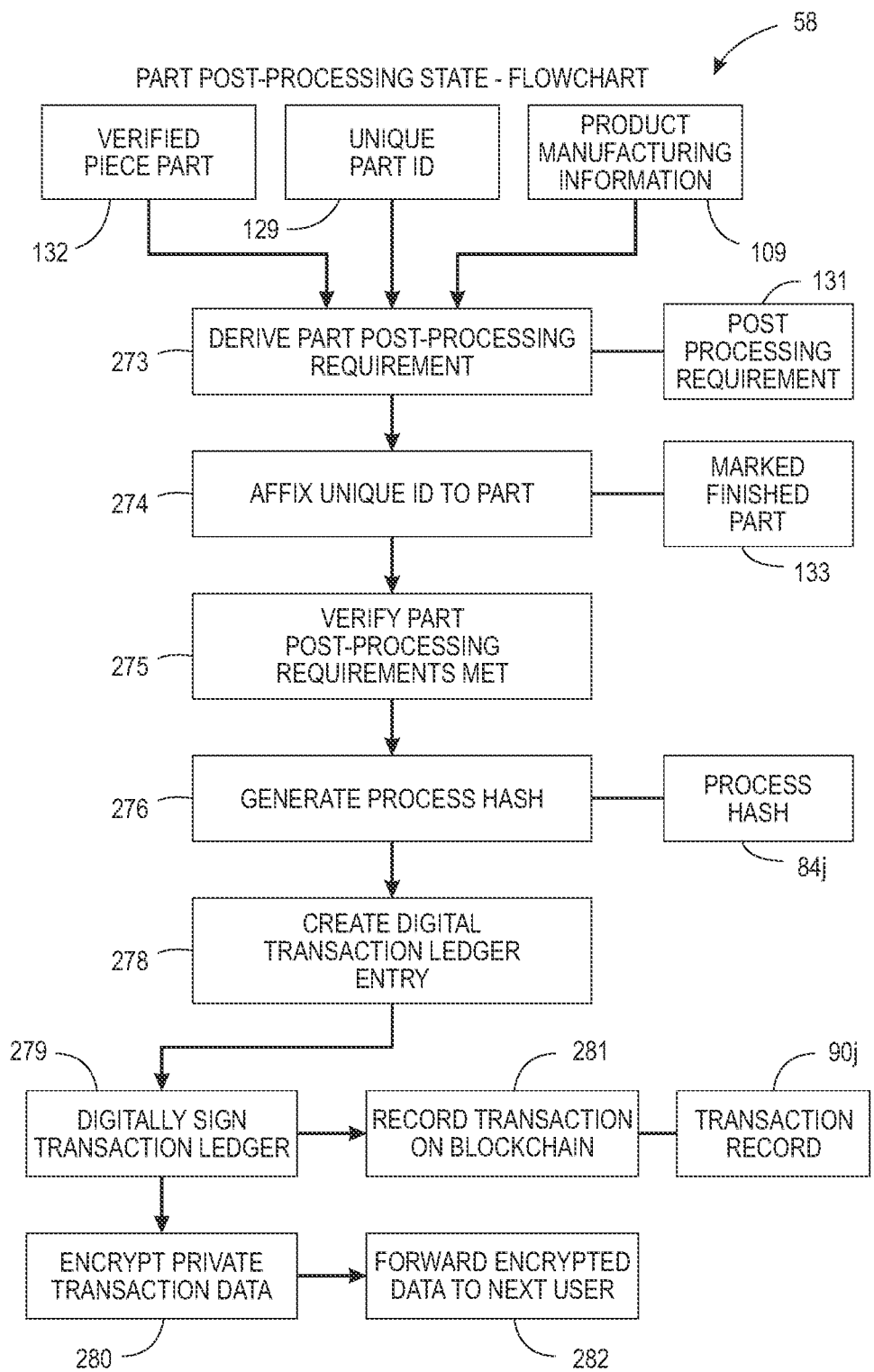
FIG. 21 is a flowchart disclosing the method steps of an embodiment of the part post-processing process state.

Looking now to FIGS. 21 and 23, the part post processing state 58 begins with receipt of the additive manufactured state piece part 132 in addition to the product manufacturing information 109 previously derived, and derives part post processing requirements 131 to certify a post processed finished part 133. It is at this stage that the unique 2D or 3D bar code or glyph 129 may be etched or otherwise affixed 274 onto the part for future authentication purposes. Certification of the part post processing process state is preferably accomplished via the recording 281 of a transaction 90$j$ in the digital ledger 17 in a manner similar to that described above.

For example, the recording of a transaction may include verifying that the post-processing transformation requirement has been met 275, generating 276 a process hash 84$j$, creating a digital transaction ledger entry 278, signing such hash 279 with a private key 82 of an individual signing the post-processor transformation state transaction, and recording this transaction information in the digital ledger 17 at a specified address. Private transaction data may be encrypted 280 and forwarded to the next user 282.

Part Inspection State.

Figure 24:
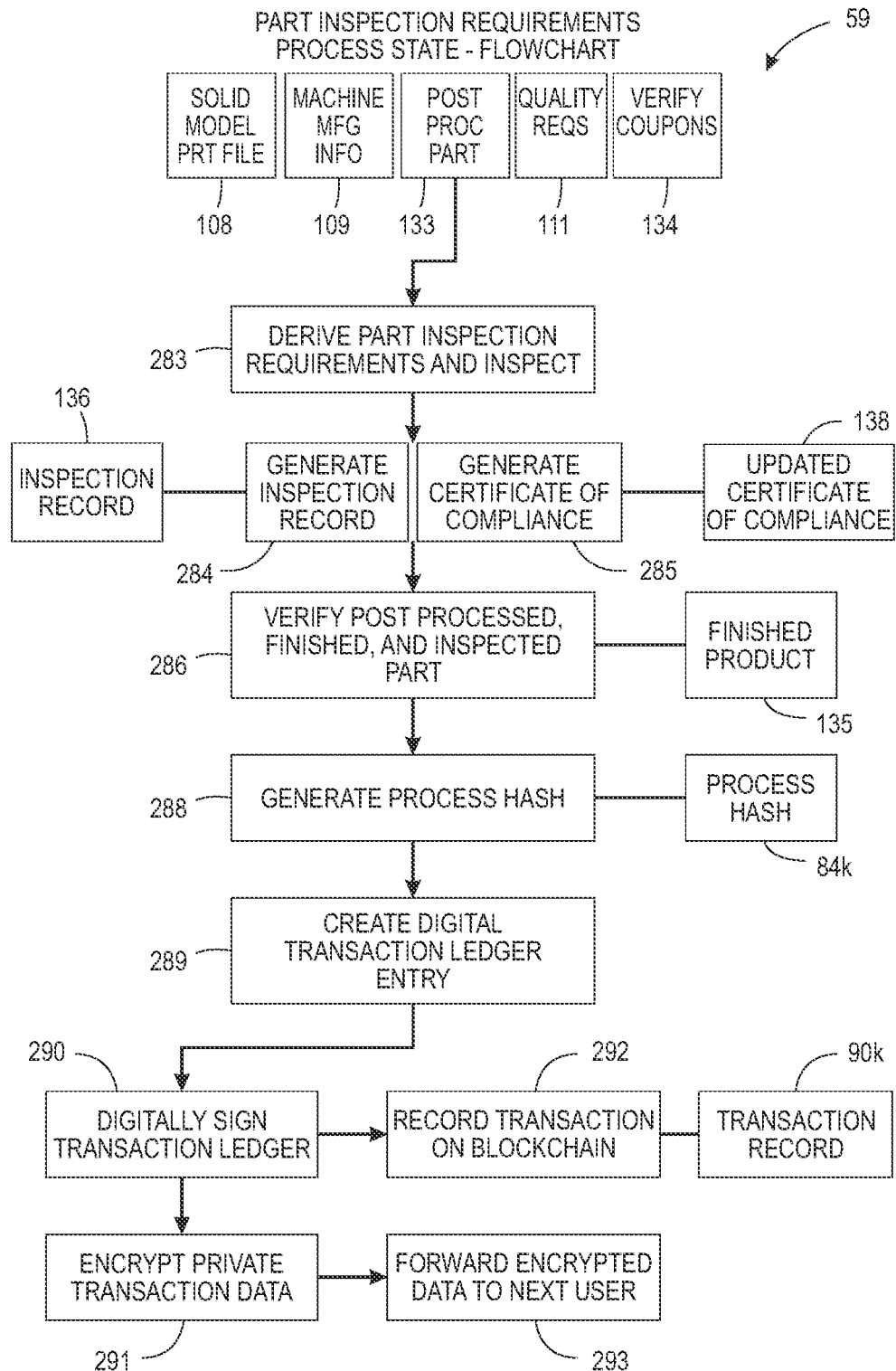
FIG. 24 is a flowchart disclosing the method steps of an embodiment of the preferred part inspection process state.

Turning to FIGS. 24 and 26, after a piece part 133 has been printed and processed, it must be inspected. Thus, the system transforms to the part inspection state 59. The post processed piece part 133 is received along with the solid model geometry files 108, the derived product manufacturing information 109, the part quality requirements 111, and the verification coupons 134; all of the above are preferably used to generate 284 an inspection record 136 and generate 285 a certificate of compliance 138. Accordingly, the process has produced a post processed, finished, and inspected additive manufactured part 135. As with the previous states, certification of the part inspection process state is preferably accomplished via the recording 292 of a transaction 90$k$ in the digital ledger 17 in a manner similar to that described above.

For example, the recording of a transaction may include verifying the post processed, finished and verified part 286, generating 288 a process hash 84$k$, creating a digital transaction ledger entry 289, signing such hash 290 with a private key 82 of an individual signing the part inspection state transaction, and recording this transaction information in the digital ledger 17 at a specified address. Private transaction data may be encrypted 291 and forwarded to the next user 293.

Part End User Delivery State.

Figure 25:
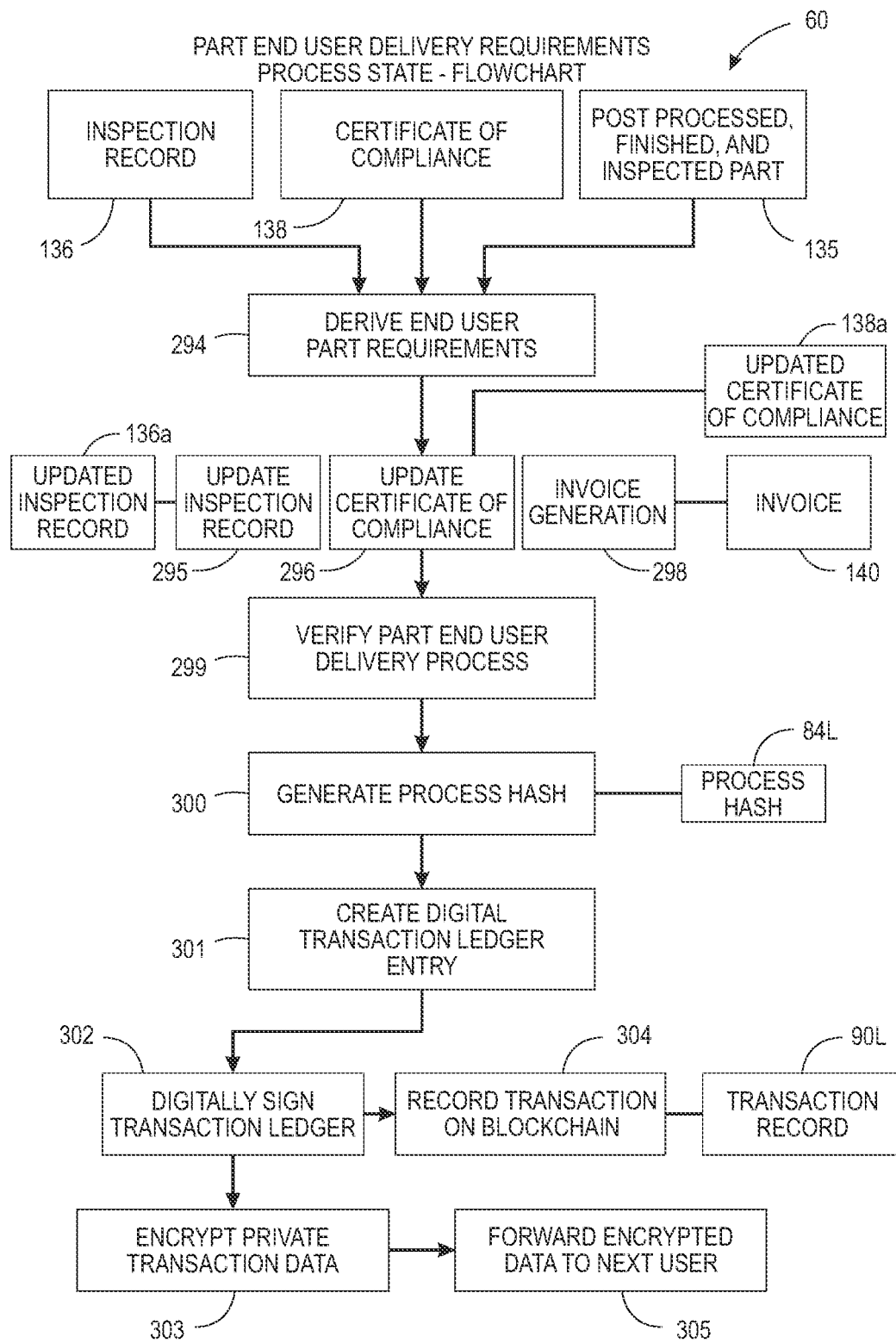
FIG. 25 is a flowchart disclosing the method steps of an embodiment of the preferred part end user delivery requirements process state.
Figure 28:
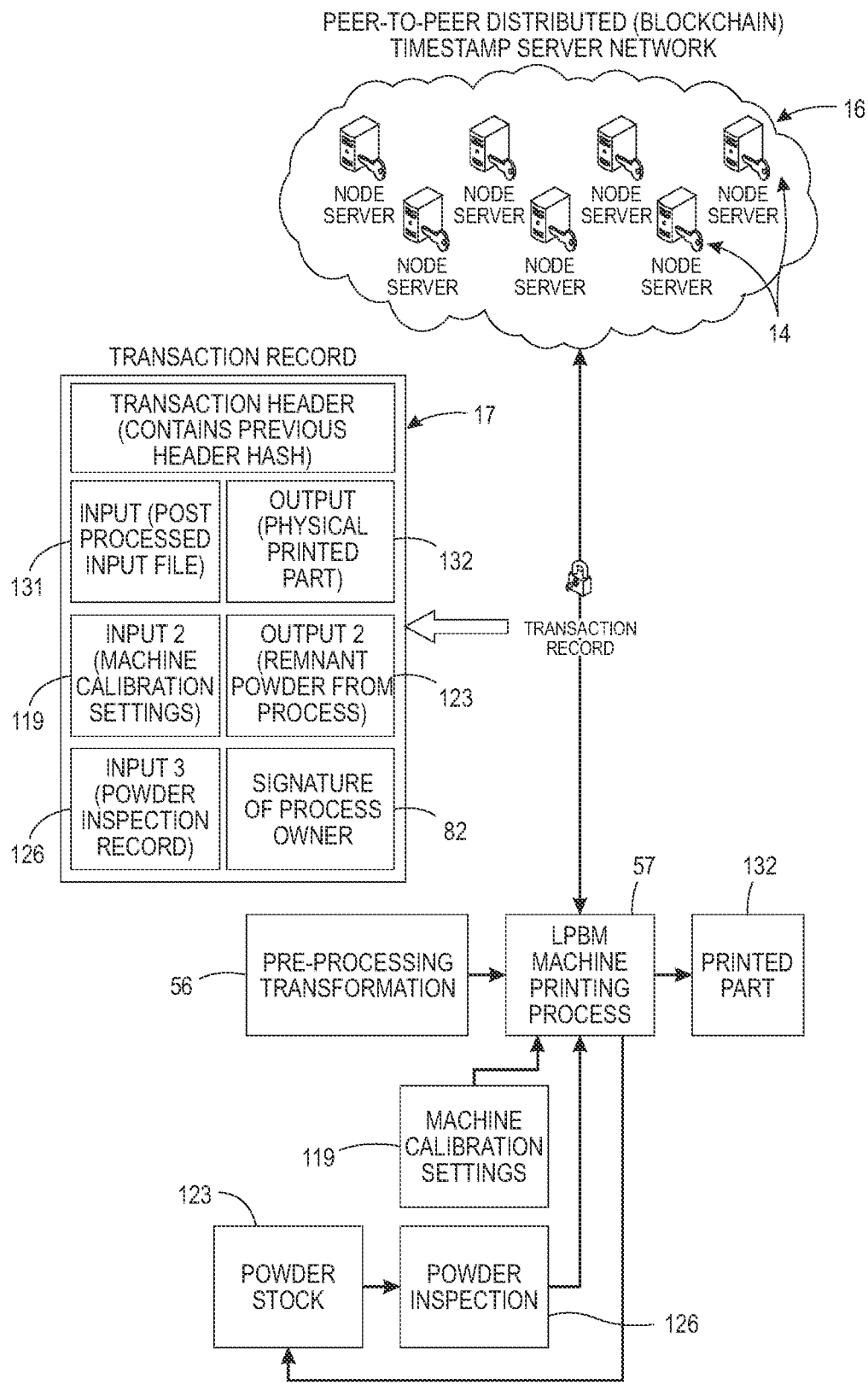
FIG. 28 is a schematic diagram showing an embodiment of a transaction record for the disclosed virtual distributed ledger system.

As shown with respect to FIGS. 25 and 27, the post processed, finished, and inspected part 135 is now ready to be delivered to an end user 29, along with the inspection record 136, the certification of compliance 138, and the certification of authenticity 305. The inspection record and/or the certification of compliance may be updated at this stage to reflect additional inspection and/or installation of the post processed, finished, and inspected part. Additionally, an invoice 140 may be automatically generated 298 at this stage. As with the previous states, certification of the part end user delivery process state 60 is preferably accomplished via the recording 304 of a transaction 90L in the digital ledger 17 in a manner similar to that described above.

For example, the recording of a transaction may include verifying the part end user delivery process 299, generating 300 a process hash 84L, creating a digital transaction ledger entry 301, signing such hash 302 with a private key 82 of an individual signing the end user delivery transformation state transaction, and recording this transaction information in the digital ledger 17 at a specified address. Private transaction data may be encrypted 303 and forwarded to the next user 305, such as an authorized repair and overhaul entity.

Part Authentication Method.

As illustrated in FIGS. 5A, 5B, 29 and 30, the disclosed system makes it easy to authenticate genuine additive manufactured parts and hard to create counterfeit copies. For instance, a unique part identifier 129 can be generated by applying a one way cryptographic hash function to mixing algorithm 41 that accepts a number of unique part inputs, such as a manufacturer's private key 82, part material composition 115, part serial number 113, part model number 114, process hash 84, manufacturer commercial and government entity (CAGE) code 120, machine model number used to produce the part 112, and machine serial number used to produce the part 121. This unique identifier can then be implanted directly onto the 3D printed part, either natively or represented via a barcode, QR code, or some other similar marking means.

Subsequently, when an end user wishes to verify a part as authentic, multiple security measure are in place, making counterfeit copies exceedingly difficult to achieve. For example, the use of a manufacturer private key 82 prevents the creation of a counterfeit hash function output 82. The use of a confidential mixing algorithm 41 prevents use of a (potentially) publically available hash function to create the hash used. The inclusion of a process hash 64 as an input captures process steps and can be proprietary to the processor or manufacturer. Further, the addition of material composition 115 as an input can be checked against something non-obvious such as an X-ray measurement of material composition 43.

The resulting analysis and comparison 306 of hash functions 85 and 85a may yield three potential outcomes: a part may either be certified as genuine, may be deemed likely genuine, or may be deemed counterfeit. For instance, if an authenticator is provided all of the inputs that are required with the exception of material composition, the authenticator may take an x-ray measurement of the material composition 43 of the part to obtain the final needed input. By comparing the resulting hash created using the given inputs and the measured material composition 43, a resulting hash 85a that exactly matches the hash of the part 85 indicates that the part is genuine. Likewise, if a matching hash can be generated by using a set of material composition inputs that is very similar to (but not exactly matching) the measured material composition, then the part can be deemed to likely be genuine. However, if the hash 85a created with the information provided and measured does not match the identifier on the part, then (assuming that the provided inputs are accurate) the part can be deemed to be fake or counterfeit.

Part Servicing, Maintenance, Repair and Overhaul

While embodiments of the present disclosure reference or describe a part that is being manufactured or produced, it should be appreciated that system 15 may continue to be used to assure the provenance and trace the servicing, maintenance, upkeep, repair and/or overhaul of a part and to assure that the materials and manuals used in such servicing of the part are authentic and authorized. Product information of a given part or product can include both original manufacturing information along with information regarding the ongoing maintenance and upkeep of the part or product and/or replacement parts and products, such as maintenance manuals or other after market requirements 65.

For example, a servicing and maintenance requirements process state may begin with receipt of a part maintenance manual. The part maintenance manual may be a comprehensive instruction manual for the servicing, repair and quality controls that are required of an authorized repair facility. The repair facility takes possession of the manual and digitally signs the transaction ledger 17 and records a transaction in the digital ledger 17 attesting that the authentic maintenance manual has been received and is being used. Upon recordation of this transaction, the process state is virtually transformed to the subsequent service and repair state.

The recording of a transaction may include, for example, verifying that the maintenance manual requirements have been received and generating a process hash using the maintenance requirements, creating a digital transaction ledger entry, and signing such hash with a private key of an individual signing the maintenance requirements state transaction, and recording this transaction information onto the digital ledger at a specified address. The specific transaction information recorded onto the digital ledger may include the above-mentioned process hash alone, or may also or alternatively include certain information derived from the maintenance requirements, such as a maintenance manual number. Private transaction data may be encrypted and forwarded to the next user.

The part is now ready to be serviced. The repair facility will preferably receive the maintenance manual and a work order. As with the previous states, certification of the service on the part is preferably accomplished via the recording of a transaction in the digital ledger 17 in a manner similar to that described above. A service record and/or a certification of repair compliance may be created or updated at this stage to reflect the services performed and any additional inspection or replacement parts. Additionally, an invoice may be automatically generated at this stage. As with the previous states, certification of the repaired part is preferably accomplished via the recording of a transaction in the digital ledger 17 in a manner similar to that described above.

Application to a Global Supply Chain.

In an alternative embodiment of the disclosure, a user of the secure and traceable manufactured part system may provide authorization to a manufactured part processor to provide value added services as part of a value added supply chain. This authorization may be granted by a design authority 21 for a final manufactured part as part of the system's provenance of control.

Individual system source authorities are able to grant a higher level of customer access to the provenance and traceability of each manufactured part out of a plurality of manufactured parts comprising a customer's higher level assembly, such that a customer can aggregate the provenance and traceability for each individual item. This aggregation can be recursive up to the highest level of production items and customers. Such capability avoids manufacturer cost and time associated with existing paper trail methods and an existing need for a variety of different computer software systems to find part numbers and give detailed answers to customer supply chain questions.

For example, a provider of flight control systems for an airframe may have one or more manufactured parts in a flight control actuator and may further have one or more manufactured parts in an on-board pump assembly supplied by a third party. By tracking an individual part along every step of a supply chain process, with certifications being attested to and recorded on a blockchain or similar ledger in the manner described above, the provider of flight control systems can then aggregate all relevant part certifications as a single additional entry onto the ledger, using any desired level of granularity. For instance, a user of the disclosed method for secure and traceable manufactured parts may aggregate all subassemblies and components of a flight control system to the flight control level.

Figure 31:
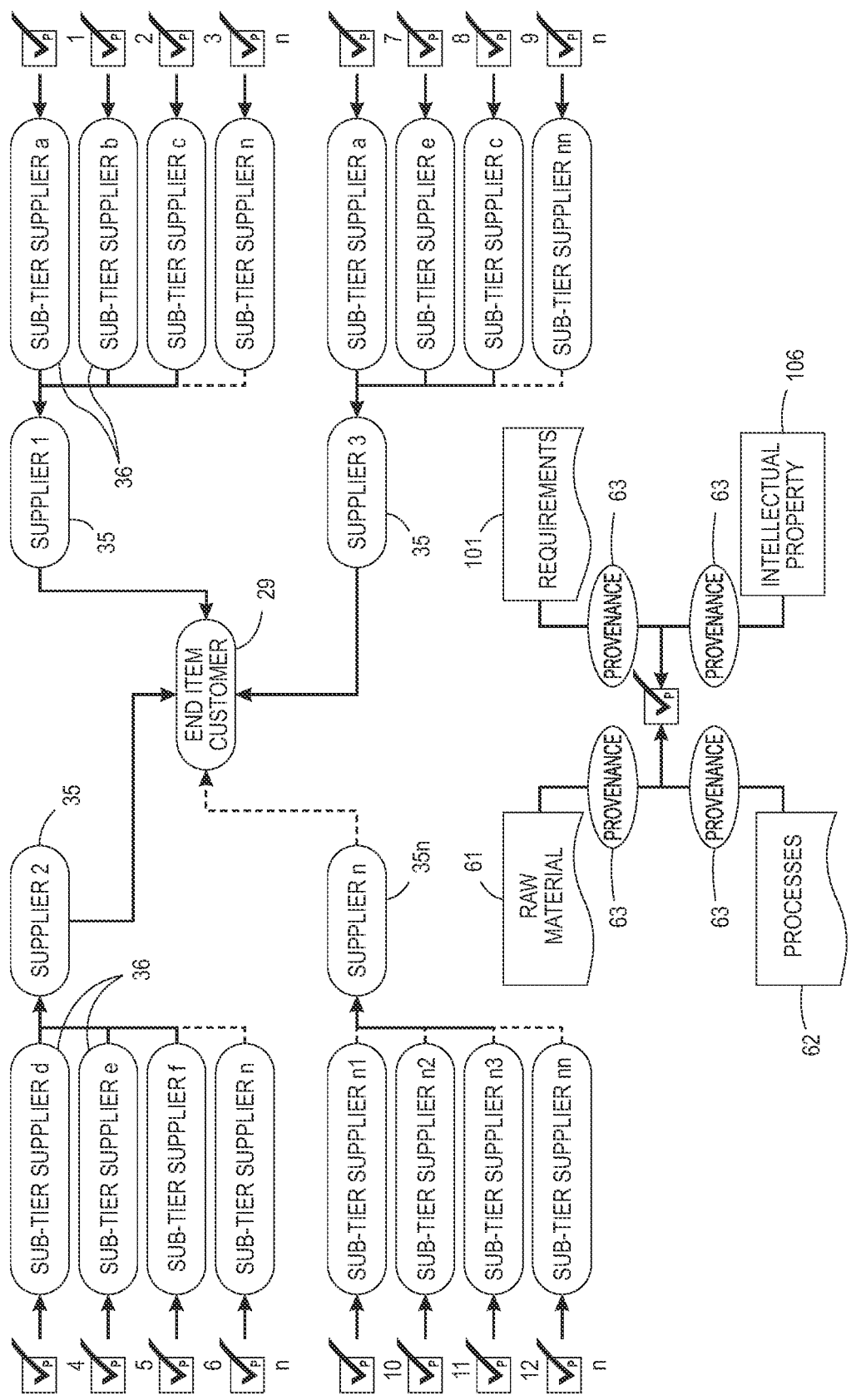
FIG. 31 is an exemplary diagram illustrating an embodiment of supplier authentication suitable for practicing exemplary embodiments of this disclosure.

Reference is now made to FIG. 31, which illustrates an exemplary supply chain having an end item customer 29, suppliers 35 and the sub-tier suppliers 36. As shown in FIG. 31, product information of a given part/product can be verified at the sub-tier supplier level 36 as indicated by the checkmarks such that a given part/product supplied to a supplier 35 and combined with other parts/products from other sub-tier suppliers and then finally supplied to the end item customer 29 can be verified by each party. Embodiments of product information of a given part/product can include part/product requirements 101, actual processes 62 or raw materials 61, custody, remuneration, intellectual property artifacts 106 (e.g., patents, trademarks, copyrights, trade secrets, know-how, etc.), a hash indicating the type of information in the specific block and/or metadata associated with the part/product. The product information of a given part/product can be maintained or entered into a blockchain or ledger (also referred to as a distributed transaction register) by each supplier 35, sub-tier supplier 36, or end item customer 29 within a supply chain such that the information can be later verified or checked. While embodiments of the present disclosure reference or describe a part/product that is being manufactured or produced, it should be appreciated that embodiments are applicable to parts/products that have already been produced or manufactured and those parts/products that require repairs, maintenance, upkeep, servicing, or overhauls. Embodiments provide that product information of a given part/product can include both original manufacturing information along with ongoing maintenance and upkeep of the part/product or replacement parts/products.

The processes 62 used to produce a part, the raw material 61 used to form a part, the requirements (e.g., customer requirements for how the part/product should perform under a particular duty cycle) of the part 101, and the intellectual property need to commercialize the part 106 can be recorded within a blockchain or similar public or private ledger as detailed above. In this regard, each element of product information is available for verification by a supplier 35, 36 within the supply chain and/or the end item customer 29. Embodiments provide that information recorded in the blockchain or ledger can serve multiple purposes. For instance, the blockchain or ledger information can be used to verify whether the part/product was made and produced to certain specifications. This will enable a supplier 35 or end item customer 29 to check that the part/product will be able to meet the supplier's or end item customer's specific needs. For instance, a given part/product may need to be made using a certain process 62 or from a certain raw material 61 such that the given part/product can perform to required duty cycles with appropriate margins. The supplier 35 or end item customer 29 will be able to verify that these raw materials or process were used in the production through the inputs in the blockchain or ledger. Embodiments also provide that a supplier 35 will be able to aggregate the provenance of their sub-tier suppliers 36 and grant access to the provenance and related documentation to their end item customer 29. The end item customer in some embodiments will be able to aggregate the provenance 63 of all their suppliers 35 and their sub-tier suppliers 36. Accordingly, each entity within a supply chain will be able to aggregate the information recorded in the blockchain or ledger that occurred downstream, and also will be able to grant access to that same information to entities upstream.

Embodiments of part/product requirements includes customer requirements 101, and requirements of a design authority 21 or the entity that designed the part/product for a particular item that has yet to be manufactured or produced. The design authority requirements 37 can include process requirements, material requirements, document requirements, part/product performance requirements, intellectual property requirements 106, and sourcing requirements (e.g., from whom materials or services must be obtained from). Embodiments of the actual processes or materials includes processes or materials that were used in the formation or production of the given part/product. Exemplary actual processes or materials includes the manufacturing process, the materials used in manufacturing, the actual documents used to produce the part/product, the part/products actual performance, and the intellectual property used or embodied within the given part/product, the entities that processed or serviced the given part/product, and post processing of the given part/product.

Embodiments of custody includes the list of entities that maintained or had access to both the physical aspects of a given part/product as well as electronic access to digital files (e.g., manuals, 3D print files, purchase orders, etc.) or documents relevant to the given part/product. For example, embodiments of custody include shippers, receivers, manufacturers, and suppliers of all or portions of a given part/product.

Figure 32:
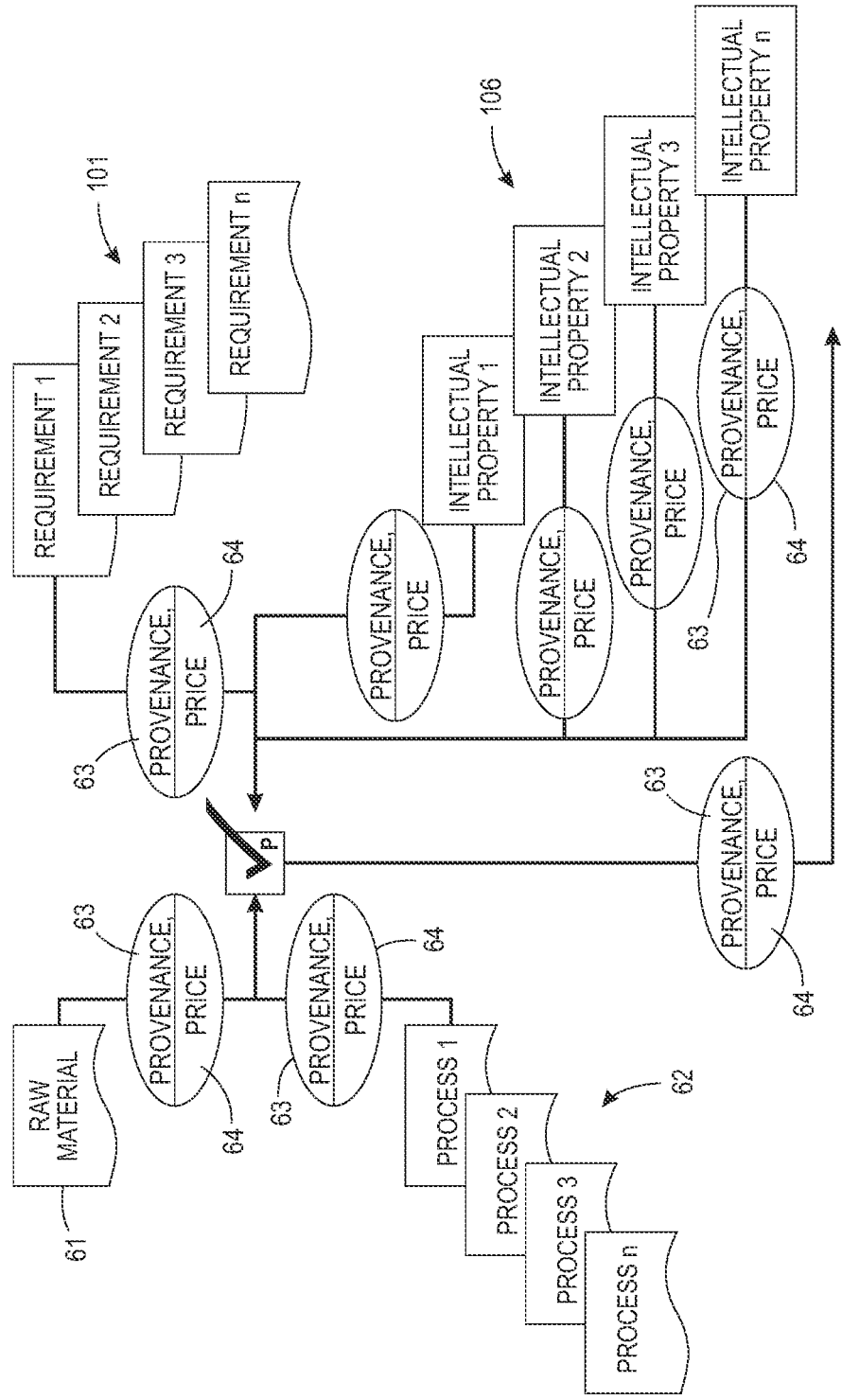
FIG. 32 is an exemplary diagram illustrating an embodiment of price transparency within a supply chain suitable for practicing exemplary embodiments of this disclosure.

Remuneration or price 64 can also be tracked and verified between each supplier 35, sub-tier supplier 36, and end item customer 29 through entries in a blockchain or ledger. Remuneration or price 64 associated with a given process, requirement, or intellectual property can also be tracked. Referring to FIG. 32, shown is an exemplary diagram wherein both price and provenance for product information associated with a given part/product can be tracked. Remuneration or the price 64 for a process, material, intellectual property, or customer requirement used to produce a given part/product can be entered into a blockchain or ledger, which can then later be verified by a supplier 35 with a supply chain or an end item customer 29. The remuneration or price information can be used to aggregate price and negotiated profits between entities in a transparent open fashion thereby allowing entities within a supply chain to pre-negotiate price for a given part/product thus increasing the speed and ease at which these transactions can take place. In addition, since remuneration for particular intellectual property will be tracked 107, owners, licensors or licensees 33 of that intellectual property can be properly compensated for those uses.

Figure 33:
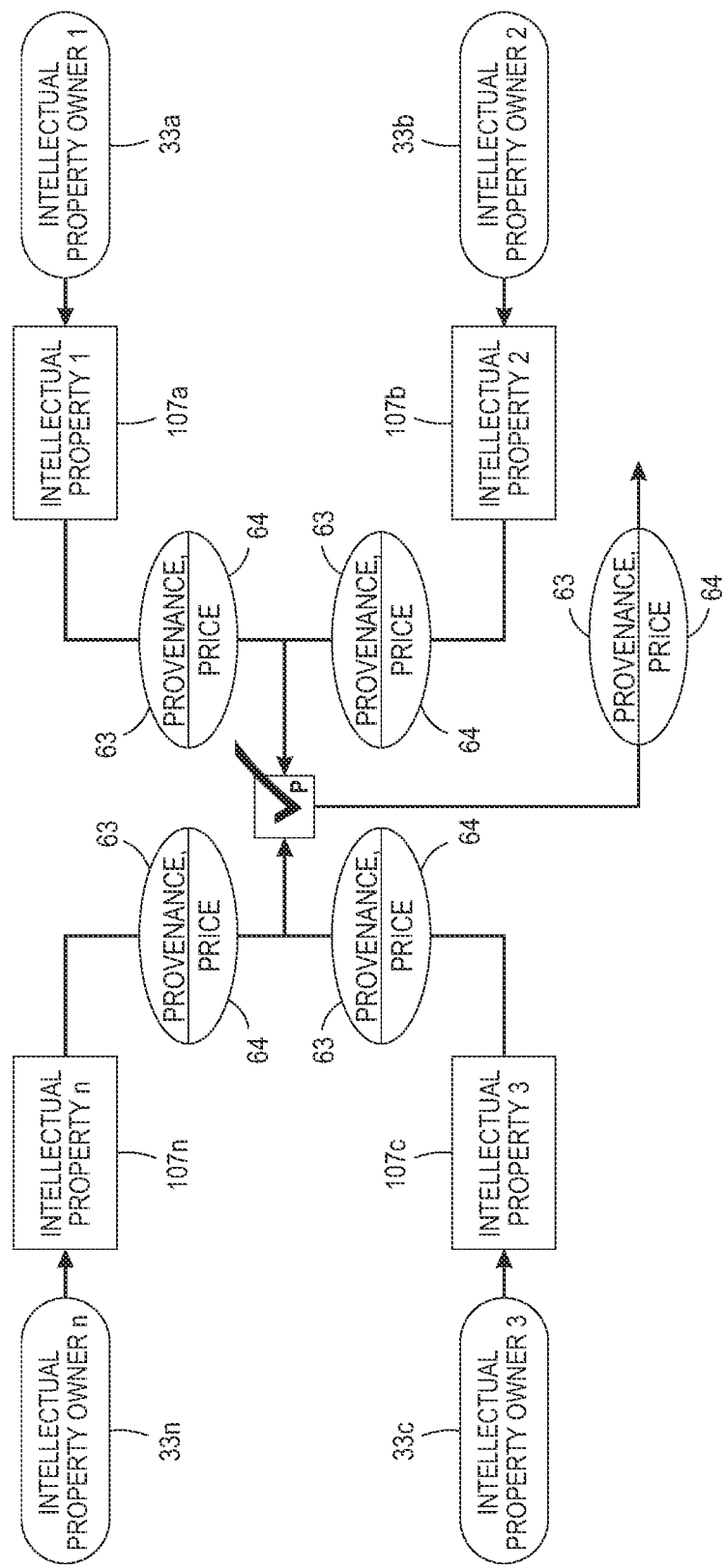
FIG. 33 is an exemplary diagram illustrating an embodiment of intellectual property tracking suitable for practicing exemplary embodiments of this disclosure.

Referring to FIG. 33, shown is exemplary diagram wherein the owner 33a-33n of intellectual property, the intellectual property itself 107, and price 64 associated with the intellectual property are tracked and verified within a blockchain or ledger. The intellectual property and its ownership provide a supplier, sub-tier supplier and/or end item customer with the ability to not only verify (through a blockchain or ledger) the provenance 63 of the intellectual property associated with a part/product, but also the ability to aggregate intellectual property elements from different owners found in a single part/product. Embodiments also allow owners of intellectual property to be properly compensated for their contributed intellectual property since each part/product will provide the intellectual property associated with it within its blockchain or ledger entry.

It should be appreciated that embodiments of the present disclosure are applicable to any number of supplier and sub-tier supplier levels. For example, a given part/product may have 1, 2, 3, or more suppliers and/or sub-tier suppliers. Embodiments of the present disclosure provide that a supplier, sub-tier supplier, and/or end item customer will be able to track and verify the provenance 63 of each part or element whether provided to the end user by a direct supplier or through the direct supplier from a sub-tier supplier. This includes not only the provenance of a specific part or element, but also documentation or information associated with the part or element. For example, the processes used to produce a part, the raw material that is used to form a part, the requirements that the part will need to meet, and any intellectual property (e.g., patents, trade secrets, inventions, know-how, etc.) embodied in the part or element can be tracked and verified by the supplier and/or the end item customer depending on their access to the information.

Referring to FIG. 1, shown is a schematic diagram of an embodiment of the disclosed virtual distributed inventory management system with traceability for a manufactured part. In FIG. 1, a workflow for a given part/product is traced from the first manufacturer transformation 23a, which may produce a work in progress (WIP) 24a, to the second manufacturer transformation 23b, which may produce WIP 24b, to the final n number manufacturer transformation 23n. In the embodiment described above, transformation 23n comprises 3D printing of the part 132 by 3D printer 31. In the embodiment described above, the transformations resulting in printed part 132 is followed by encoding and the final inspection 59 of the product and then by the final delivery 60 of the product 135. It should be noted that after each transformation, an entry into the blockchain or ledger is created thereby recording information (e.g., requirements, custody, processes, intellectual property, etc.) from each of the transformations. This information is then available for verification for any one of the suppliers (provided they are allowed access) and to the end item customer 29. Thus, embodiments cause the required processing along the manufacturing transformation to be followed with authorized and certified participants as part of a predefined process flow.

In practice, one embodiment of the present disclosure provides that a supplier 35, sub-tier supplier 36 or end item customer 29 may desire to verify the product information for a given part/product. For instance, the supplier 35, sub-tier supplier 36 or end item customer 29 may want to verify that the given part/product was made using the correct process 62, with the correct raw materials 61 or with the correct intellectual property 106. The supplier 35, sub-tier supplier 36 or end item customer 29 would be able to after receiving the part/product or prior to receiving the part/product can determine from the entries in the associated distributed transaction register (e.g., blockchain or ledger) the product information of the given part/product. The supplier 35, sub-tier supplier 36 or end item customer 29 would then be able to aggregate the product information to meet their individual needs to determine, for example, whether the they have correctly priced the part/product, whether they have properly used the intellectual property, or whether they have properly remunerated the correct entities.

Additional features include an ability for a user of the disclosed system to grant aggregation rights, for specific manufactured parts aggregated in the above flight control system example, to an airframe manufacturer. The airframe manufacturer may then grant aggregated traceability rights to all manufactured parts in the airframe to an airframe operator.

The infrastructure of the disclosed method may further be used to aggregate costs and negotiated profits in a transparent way to allow for pre-negotiated prices for manufactured parts to speed transactions. Transactions can be logged and cleared in the distributed ledger, as is described above in further detail. Intellectual property elements from different owners may also be aggregated into a single ledger entry, such that respective intellectual property assets may be tracked together, and individual owners compensated according to agreed-upon terms.

Integration with Business Management Software.

Product manufacturers will often utilize business management software such as enterprise resource planning (ERP software) to collect, store, manage and interpret data associated with tracking supply chains such as product planning, manufacturing, delivery, marketing, sales, inventory management, shipping, payment, and the like. ERP software may provide functionality such as the generation of heat maps. For example, a manufacturer's ERP software may be configured to track a plurality of suppliers of raw materials, and may generate a heat map illustrating which suppliers are exceeding deadlines (such suppliers may appear on a screen colored in green), which suppliers are generally meeting deadlines (and thus may be colored in yellow), and which suppliers are not meeting deadlines (and thus may be colored in red).

While such capabilities serve to allow a manufacturer to observe supply chain trends from a high level, it is nonetheless difficult for a manufacturer to make real-time business decisions regarding suppliers without having access to a finer level of data. For example, ERP systems are often not interfaced with other operations processes. As a result, multiple layers of non-value added processes are included in many supply chains, such as shipping and inventory maintenance. The disclosed method of secure and traceable manufactured parts reduces such inefficiencies by disassociating the supply chain through the use of the distributed ledger as described herein.

The method of secure and traceable manufactured parts further provides for an application program interface (API) that can access data from existing ERP software in addition to the distributed ledger described above, and provide integrated real-time snapshots of supplier performance. Accordingly, users now have access to supplier data with a level of granularity down to an individual manufactured part.

In yet another embodiment, provided is a system to track intellectual property (IP) within a product lifecycle management (PLM) system or other applicable computer system such that a user or company can manage the IP that is associated with or embodied within the parts, assemblies, products, materials, processes, features, and/or services it manufactures, produces, provides or which it has purchased. Embodiments provide that a given part or product can have one or more discrete objects or product information associated with it. These objects or product information include the IP embodied within the product. Embodiments provide that the IP objects 105-107 associated with a given part or product can be saved or categorized within a system, ledger, blockchain, distributed transaction register, or database such that the IP associated with the given part or product can be maintained for later use.

Embodiments further allow users, companies, or customers of the system to manage and reuse IP including but not limited to layout-designs, trademarks, licenses, trade secrets, industrial property, patents, copyrights, proprietary information, sensitive information, and know-how. Embodiments also provide that a PLM or similar system can be searched for IP content such that appropriate security and markings can be applied to the parts/products if needed. Embodiments of the present disclosure provide an improved ability to capture, classify, track, preserve, and protect IP that is derived for or embodied within a given part or product including research and development, third party licenses, and failure analysis. Other embodiments of IP also include mechanical, electrical, firmware, software, processes, and materials associated with a given part/product. Some of the other elements that can be associated with a given part/product also include a heritage or history of the source of IP embodied within a part/product, where the IP is used, and what the IP is used with. Embodiments also provide that the IP objects of a given part/product can be encoded or hashed with an encryption. In yet another embodiment, IP objects of a given part/product can be made available in a private or public marketplace (e.g., digital marketplace) for use in other products. Embodiments of encryption methods include a public or private key, or it can include a distributed ledger such as a blockchain.

Figure 34:
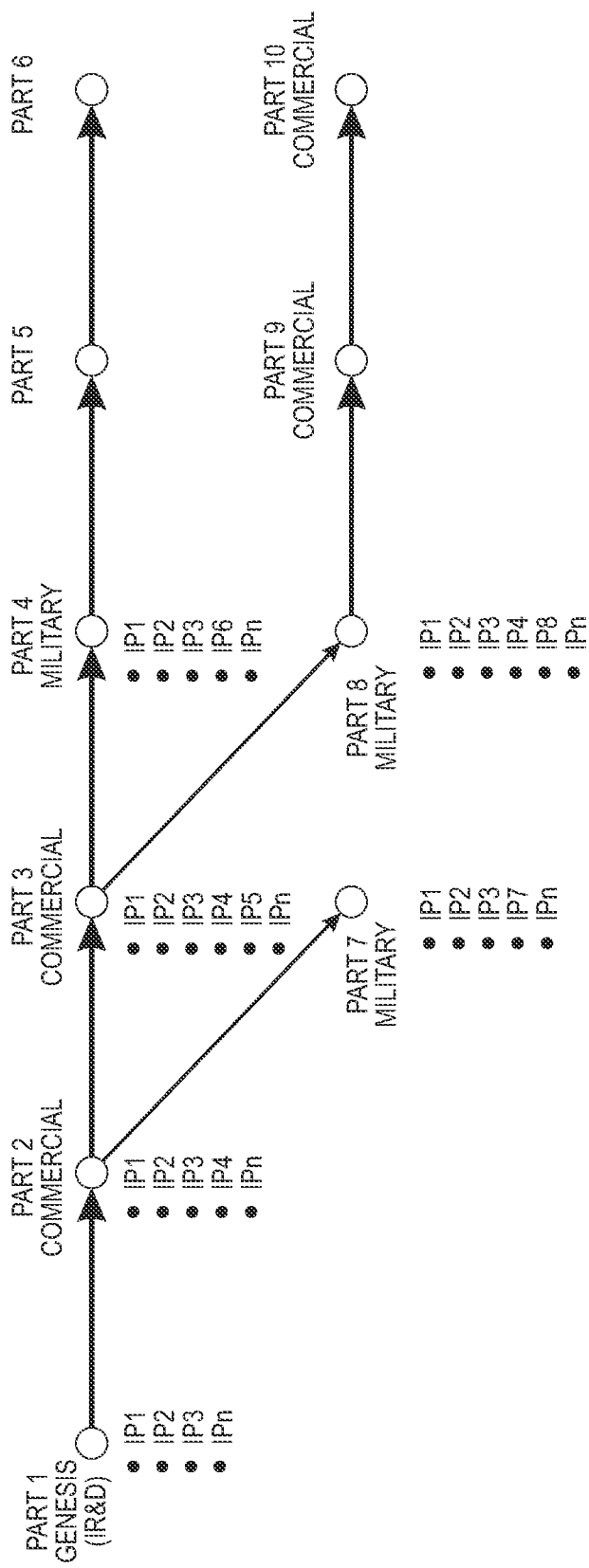
FIG. 34 is an exemplary diagram illustrating intellectual property embodied in the production of a product suitable for practicing exemplary embodiments of this disclosure.
Figure 35:
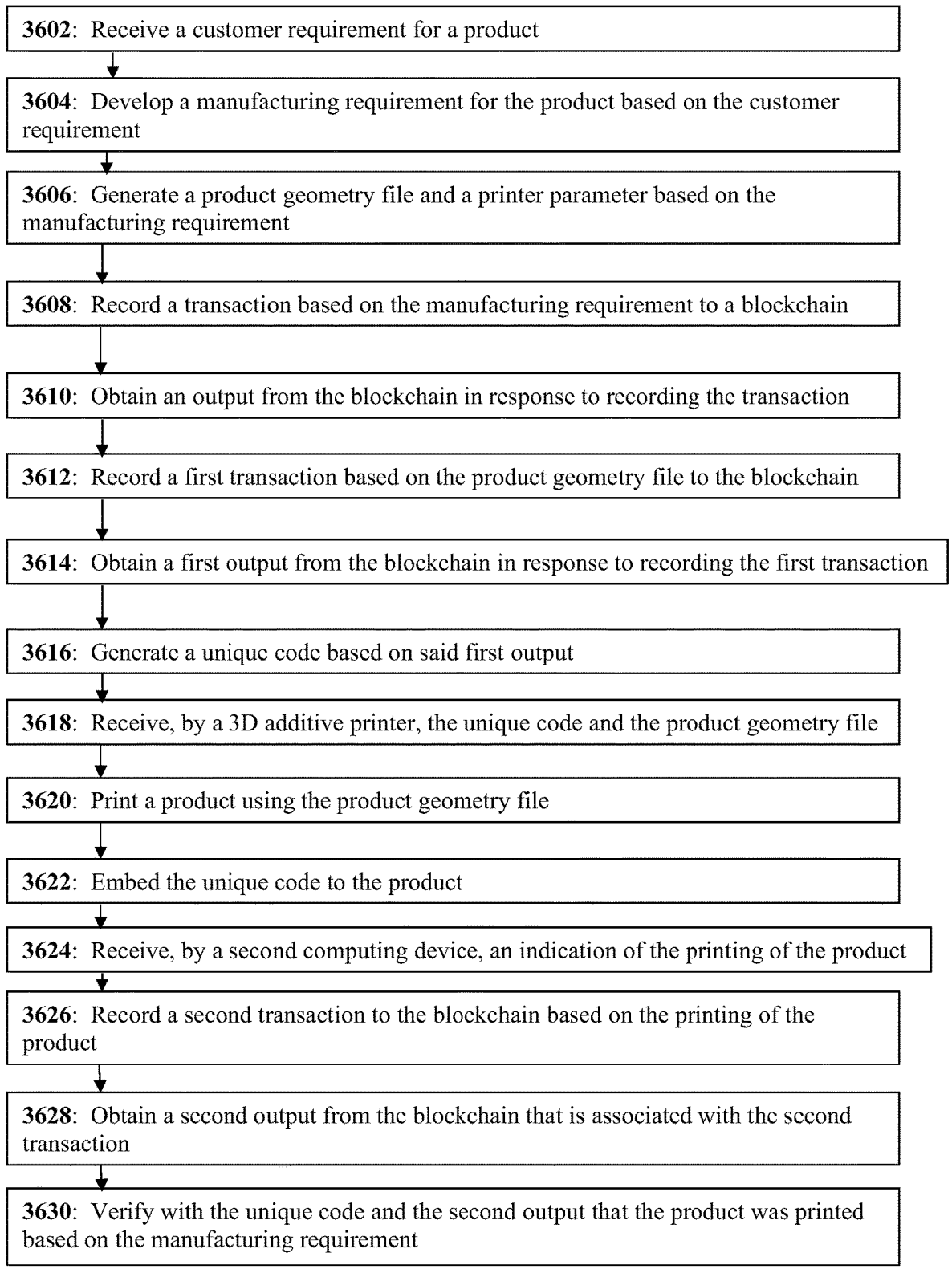
FIG. 35 is an exemplary logic flow diagram suitable for practicing exemplary embodiments of this disclosure.

FIG. 34 is an exemplary diagram illustrating IP objects IP 1-IP n that are associated with a given part or product through its production cycle. As shown in FIG. 34, a product that passes through multiple parts or stages as part of a production or manufacturing process, such as Part 1, Part 2, Part 3, and Part 4, can have multiple IP objects associated with it at each stage. In practice, this often occurs when an end item includes numerous parts from numerous sources or must go through a number of manufacturing processes before it is finalized or ready for an end user. In this and other similar scenarios, it is often difficult to track all of the IP embodied in the end item. Embodiments of the present disclosure allow a supplier or manufacturer to record in a database or ledger the IP embodied in a part or product throughout its production lifecycle or during its useful life such that the IP embodied in the part/product can be tracked and verified. In other words, the history or heritage of IP associated or embodied within a given part/product can be tracked and available for a supplier within the given part's supply chain or by an end user.

Embodiments provide that the IP embodied within a given part/product can be recorded within a blockchain or ledger, however, embodiments provide that the IP can be managed or maintained within an electronic database that can be accessed by any number of users. Embodiments of the electronic database include closed or private databases used by a single user or single company. In other embodiments, the electronic database can be accessible by a plurality of users and/or companies. In yet another embodiment, the electronic database can be a public marketplace wherein owners, creators, and inventors of the IP along with the users of the IP embodied in parts/products can access information regarding where certain IP is used, how often the IP is used, and to whom should remuneration be made for the right to use such IP.

In one embodiment, an end item can contain one or more IP objects along with other engineering, quality or customer specifications or requirements. The IP objects embodied in the end item are thus operable to be included in the other end item specifications that follow the end item during its use and lifecycle. The end item can have a restriction and designation for the specific IP objects based on all of the IP objects that it contains. The IP objects can be aggregated, tracked, reused, and sold.

The present invention contemplates that many changes and modifications may be made. Therefore, while the presently-preferred form of the system has been shown and described, and several modifications and alternatives discussed, persons skilled in this art will readily appreciate that various additional changes and modifications may be made without departing from the scope of the invention, as defined and differentiated by the following claims.

What is claimed is:

1. A method for the verification and authentication of additive manufactured product using a plurality of computing devices, a plurality of 3D additive printers, and a distributed transaction register, wherein the distributed transaction register comprises a blockchain, a plurality of nodes at different locations each with a copy of a ledger, comprising the steps of:

receiving, by a first computing device of the plurality of the computing devices, at least one customer requirement for a product;

developing, by said first computing device, from said at least one customer requirement, at least one manufacturing requirement for said product;

generating, by said first computing device, from said manufacturing requirement, a product geometry file and at least one printer parameter;

recording, by said first computing device, a transaction based on said at least one manufacturing requirement to the distributed transaction register, wherein recording said transaction to the distributed transaction register further comprises recording said transaction to a first block of said blockchain;

obtaining, by said first computing device, an output from said distributed transaction register in response to said recording said transaction on said distributed transaction register;

recording, by said first computing device, a first transaction based on said product geometry file to the distributed transaction register;

obtaining, by said first computing device, a first output from said distributed transaction register in response to said recording said first transaction on the distributed transaction register;

generating, by said first computing device, a unique code based on said first output;

receiving, by a 3D additive printer of the plurality of the 3D additive printers, said product geometry file and said unique code;

printing, by said 3D additive printer, a product using the product geometry file;

embedding, by said 3D additive printer, within or affixing to said product said unique code;

receiving, by a second computing device of the plurality of the computing devices, an indication that said product has been printed by said 3D additive printer, wherein the indication comprises said output and said first output;

recording, by said second computing device, to said distributed transaction register, a second transaction based on said printing of said product and said first output;

obtaining, by said second computing device, a second output from said distributed transaction register that is associated with said second transaction;

verifying, by said second computing device and using said unique code, said output, said first output and said second output, that said product was printed according to the at least one manufacturing requirement; and authenticating, by said second computing device, said product based on the verifying.

2. The method set forth in claim 1, wherein said at least one customer requirement for said product is selected from a group consisting of quality parameters, material composition requirements, product definitions, manufacturing requirements and an IP artifact.

3. The method set forth in claim 1, wherein said at least one manufacturing requirement for said product is selected from a group consisting of product size, product weight, product strength, product geometry, a computer aided design (CAD) file, and an IP artifact.

4. The method set forth in claim 1, wherein said product geometry file is one of (i) an additive manufacturing file or (ii) a stereolithography file.

5. The method set forth in claim 1, comprising the steps of:
  generating, by said first computing device, from said manufacturing requirement at least one 3D additive printer material parameter and at least one 3D additive printer calibration parameter;
  recording, by said first computing device, to said distributed transaction register said first transaction, wherein said first transaction is based on said at least one 3D additive printer material parameter and said at least one 3D additive printer calibration parameter;
  printing, by said 3D additive printer, said product using said product geometry file and said at least one 3D additive printer material parameter; and
  verifying, by said first computing device, said at least one 3D additive printer material parameter and said at least one 3D additive printer calibration parameter with said unique code.

6. The method set forth in claim 5, wherein said at least one 3D additive printer calibration parameter is selected from a group consisting of speed, power, scan rate, and feed rate.

7. The method set forth in claim 5, wherein said at least one 3D additive printer material parameter is selected from a group consisting of aluminum, titanium, stainless steel, cobalt chrome, inconel, maraging steel, hastalloy-X, and copper.

8. The method set forth in claim 1, comprising the steps of:
  recording, by a third computing device of the plurality of the computing devices, to said distributed transaction register, a third transaction based on said at least one customer requirement for said product;
  obtaining, by said third computing device, a third output from said distributed transaction register that is associated with said third transaction;
  recording, by a fourth computing device of the plurality of the computing devices, to said distributed transaction register, a fourth transaction based on said at least one manufacturing requirement for said product;
  obtaining, by said fourth computing device, a fourth output from said distributed transaction register that is associated with said fourth transaction;
  wherein said fourth output is based on said third output and said first output is based on said fourth output; and
  verifying, by said fourth computing device, said at least one customer requirement for said product and said at least one manufacturing requirement for said product with said unique code.

9. The method set forth in claim 8, wherein said at least one customer requirement for said product is selected from a group consisting of quality parameters, material composition requirements, product definitions, and manufacturing requirements.

10. The method set forth in claim 8, wherein said at least one manufacturing requirement for said product is selected from a group consisting of product size, product weight, product strength, and product geometry.

11. The method set forth in claim 8, comprising the steps of:
  recording, by a fifth computing device of the plurality of the computing devices, to said distributed transaction register, a fifth transaction based on said embedding within or affixing to said product said unique code based on said second output;
  obtaining, by the fifth computing device, a fifth output from said distributed transaction register that is associated with said fifth transaction and said second output;
  inspecting, by the fifth computing device, said product;
  recording, by a sixth computing device of the plurality of the computing devices, to said distributed transaction register, a sixth transaction based on said inspection of said product; and
  verifying, by the sixth computing device, said product with said unique code and said inspection with said distributed transaction register.

12. The method set forth in claim 11, comprising the steps of:
  obtaining, by the sixth computing device, a sixth output from said distributed transaction register that is associated with said sixth transaction and said fifth output;
  recording, by a seventh computing device of the plurality of the computing devices, to said distributed transaction register, a seventh transaction based on a delivery of said product to said end user; and
  verifying, by the seventh computing device, said delivery of said product to said end user with said distributed transaction register.

13. The method set forth in claim 12, comprising the steps of obtaining, by the seventh computing device, a seventh output from said distributed transaction register that is associated with said seventh transaction and said sixth output;
  recording, by an eighth computing device of the plurality of the computing devices, to said distributed transaction register, an eighth transaction based on installation of said product for end use; and
  verifying, by the eighth computing device, said installation of said product for end use with said distributed transaction register.

* * * * *